(12) United States Patent
Sethi et al.

(10) Patent No.: US 11,868,791 B2
(45) Date of Patent: Jan. 9, 2024

(54) METHOD AND SYSTEM FOR DETERMINING THE NEXT STATE OF APPLICATION UPGRADES USING A DEVICE EMULATION SYSTEM OF A CUSTOMER ENVIRONMENT

(71) Applicant: Dell Products L.P., Round Rock, TX (US)

(72) Inventors: Parminder Singh Sethi, Ludhiana (IN); Lakshmi Saroja Nalam, Bangalore (IN); Shelesh Chopra, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 106 days.

(21) Appl. No.: 17/571,136

(22) Filed: Jan. 7, 2022

(65) Prior Publication Data
US 2023/0221972 A1    Jul. 13, 2023

(51) Int. Cl.
*G06F 9/455*    (2018.01)
*G06F 18/214*    (2023.01)
*G06N 20/00*    (2019.01)

(52) U.S. Cl.
CPC ........ *G06F 9/45508* (2013.01); *G06F 18/214* (2023.01); *G06N 20/00* (2019.01)

(58) Field of Classification Search
None
See application file for complete search history.

(56) References Cited

U.S. PATENT DOCUMENTS

| | | |
|---|---|---|
| 7,590,981 B2 | 9/2009 | Gupta et al. |
| 8,078,448 B1 | 12/2011 | Wohlberg et al. |
| 10,805,171 B1 | 10/2020 | Anwer et al. |
| 11,436,330 B1 | 9/2022 | Jennings et al. |
| 11,635,973 B2* | 4/2023 | Sethi ............... G06F 9/455 717/168 |
| 11,695,274 B1* | 7/2023 | Lemsaddek ......... H02J 3/144 700/295 |
| 2008/0281833 A1* | 11/2008 | Cain ............... G06Q 10/06 |
| 2011/0113224 A1 | 5/2011 | Isshiki et al. |
| 2011/0270959 A1* | 11/2011 | Schlusser ............ H04L 65/70 709/223 |
| 2015/0278219 A1 | 10/2015 | Phipps |
| 2016/0162280 A1* | 6/2016 | Murayama ............ G06F 8/65 717/170 |
| 2018/0113728 A1* | 4/2018 | Musani ............ G06F 11/362 |
| 2019/0196938 A1 | 6/2019 | Mathen et al. |

(Continued)

FOREIGN PATENT DOCUMENTS

KR      102312735 B1    10/2021

*Primary Examiner* — Philip Wang
(74) *Attorney, Agent, or Firm* — Chamberlain, Hrdlicka, White, Williams & Aughtry

(57) ABSTRACT

A method for managing a client environment includes obtaining, by a predictor, a future state prediction request associated with an application upgrade on an emulation of a client device, wherein the application upgrade failed; in response to the future state prediction request: obtaining live data associated with the application upgrade; performing natural language processing on the live data to obtain processed live data; applying a future state prediction model to the processed live data to generate a future state prediction; and initiating the remediation of the application upgrade based on the future state prediction.

14 Claims, 25 Drawing Sheets

(56) References Cited

U.S. PATENT DOCUMENTS

| | | | |
|---|---|---|---|
| 2019/0327154 A1* | 10/2019 | Sahoo | H04L 43/045 |
| 2020/0156243 A1 | 5/2020 | Ghare et al. | |
| 2021/0124672 A1 | 4/2021 | Abdelhalim et al. | |
| 2021/0149658 A1* | 5/2021 | Cannon | G06N 3/04 |
| 2021/0326196 A1 | 10/2021 | Moss | |
| 2022/0365771 A1* | 11/2022 | Shelke | G06F 11/0793 |
| 2022/0382722 A1 | 12/2022 | Mahna et al. | |
| 2022/0398117 A1* | 12/2022 | Sethi | G06F 9/44505 |
| 2023/0112710 A1 | 4/2023 | Huang et al. | |
| 2023/0185558 A1* | 6/2023 | Sethi | G06F 11/079 717/168 |

* cited by examiner

US 11,868,791 B2

METHOD AND SYSTEM FOR DETERMINING THE NEXT STATE OF APPLICATION UPGRADES USING A DEVICE EMULATION SYSTEM OF A CUSTOMER ENVIRONMENT

BACKGROUND

Computing devices in a system may include any number of internal components such as processors, memory, and persistent storage. The computing devices may execute applications (e.g., software). Each application may be upgraded to newer versions. Each application may be upgraded to newer versions. The aforementioned application upgrades may fail. It may be desirable to identify the state of an application upgrade to determine whether to determine whether an application upgrade was successful. The state of application upgrades may change over time. It may be desirable to predict the future state of application upgrades.

SUMMARY

In general, certain embodiments described herein relate to a method for managing a client environment. The method may include obtaining, by a predictor, a future state prediction request associated with an application upgrade on an emulation of a client device, wherein the application upgrade failed; in response to the future state prediction request: obtaining live data associated with the application upgrade; performing natural language processing on the live data to obtain processed live data; applying a future state prediction model to the processed live data to generate a future state prediction; and initiating the remediation of the application upgrade based on the future state prediction.

In general, certain embodiments described herein relate to a system for managing a client environment. The system includes a device emulation system, a client environment, a processor, and memory including instructions, which when executed by the processor, perform a method. The method may include obtaining, by a predictor, a future state prediction request associated with an application upgrade on an emulation of a client device, wherein the application upgrade failed; in response to the future state prediction request: obtaining live data associated with the application upgrade; performing natural language processing on the live data to obtain processed live data; applying a future state prediction model to the processed live data to generate a future state prediction; and initiating the remediation of the application upgrade based on the future state prediction.

In general, certain embodiments described herein relate to a non-transitory computer readable medium that includes computer readable program code, which when executed by a computer processor enables the computer processor to perform a method for managing a client environment. The method may include obtaining, obtaining, by a predictor, a future state prediction request associated with an application upgrade on an emulation of a client device, wherein the application upgrade failed; in response to the future state prediction request: obtaining live data associated with the application upgrade; performing natural language processing on the live data to obtain processed live data; applying a future state prediction model to the processed live data to generate a future state prediction; and initiating the remediation of the application upgrade based on the future state prediction.

Other aspects of the embodiments disclosed herein will be apparent from the following description and the appended claims.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

DETAILED DESCRIPTION

Figure 1:
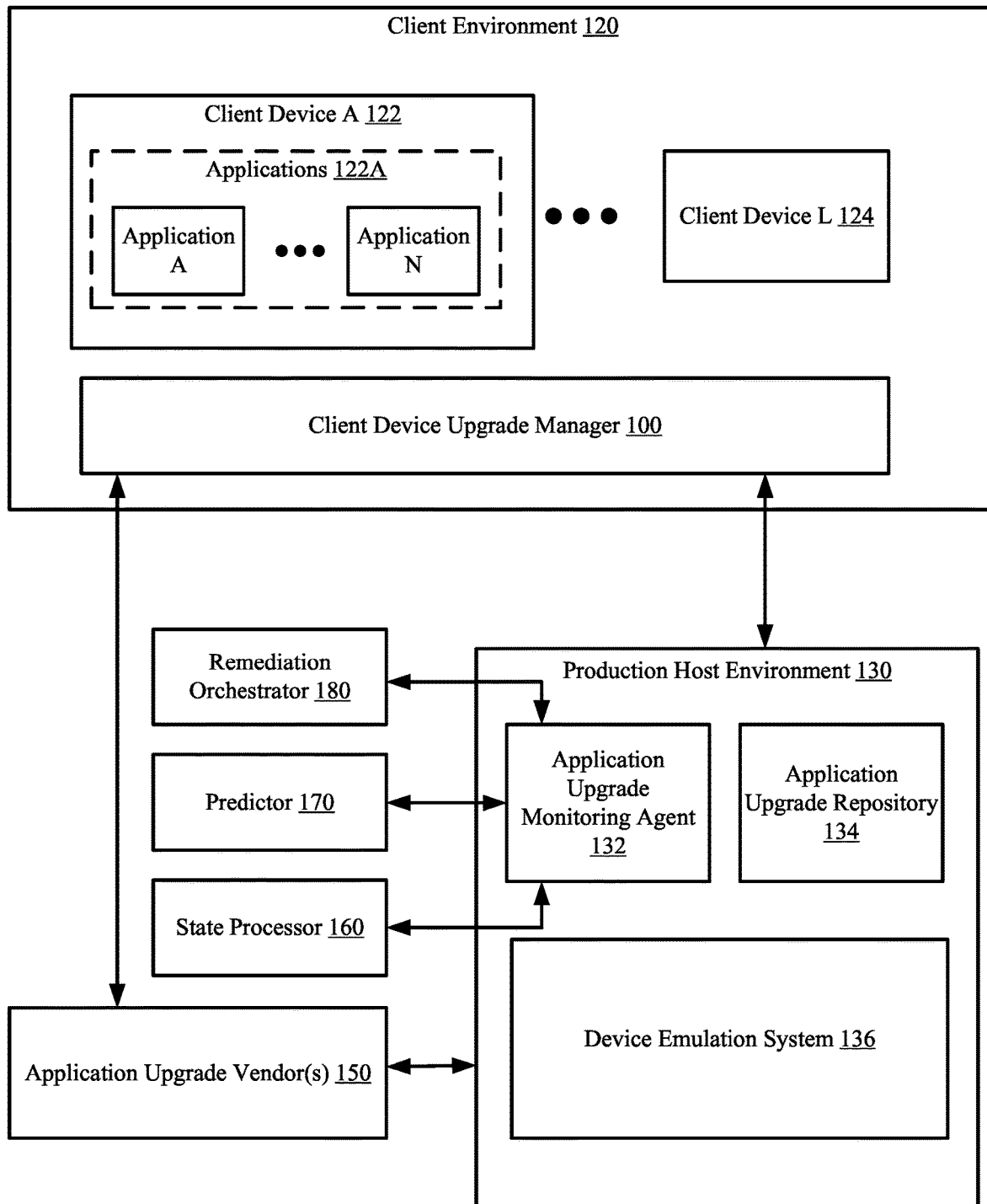
FIG. 1 shows a diagram of a system in accordance with one or more embodiments of the invention.

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

In general, embodiments of the invention relate to a method and system for managing applications. Specifically, embodiments of the invention improve the use of computing devices that emulate a customer environment of client devices. Embodiments of the invention include a method and system for generating future state predictions associated with application upgrades performed on an emulated device. The future state predictions may be used to remediate application upgrades that have failed due to the dynamic nature of application upgrades over time. The future state predictions may indicate the most likely future state of the application upgrade. As a result, application upgrade failures may be remediated based on the most likely future state of the application upgrade instead of only the current state of the application upgrade. Therefore, state changes in application upgrades that have failed may be taken into account when remediating application upgrade, improving the reliability and efficiency of remediating application upgrade failures.

As a simple example, during an application upgrade, a previous application version may require installation before performing the application upgrade. When attempting to install the previous application version, a storage device of the device for which the application upgrade is being performed may not have sufficient storage to both install the previous application version and perform the application upgrade. As a result, the application upgrade may fail. The log information may indicate the current state of the application upgrade is storage device capacity reached. The future state, which is the result of the current state, may be that the previous application version was not installed. Therefore, the future state may indicate that the remediation steps of increasing storage device capacity and installing the previous application version may remediate the application upgrade failure. The current state of application upgrade failures may include any potential application upgrade state (e.g., operating system incompatibility, CPU overload, incorrect previous application version installed, etc.) without departing from the invention. The future state of the application upgrade may include any potential future application upgrade state associated with the current application upgrade state without departing from the invention.

FIG. 1 shows an example system in accordance with one or more embodiments of the invention. The system includes a client environment (120), one or more application upgrade vendors (150), a production host environment (130), a state processor (160), a predictor (170), and a remediation orchestrator (180). The system may include additional, fewer, and/or different components without departing from the invention. Each component may be operably connected to any of the other components via any combination of wired and/or wireless connections. Each component illustrated in FIG. 1 is discussed below.

In one or more embodiments of the invention, the client environment includes client devices (122, 124) and a client device upgrade manager (100). Each client device (122, 124) may include applications (122A). The applications (122A) may be logical entities executed using computing resources (not shown) of the client devices (122, 124). Each of the applications may be performing similar or different processes. In one or more embodiments of the invention, the applications (122A) provide services to users, e.g., clients (not shown). For example, the applications (122A) may host components. The components may be, for example, instances of databases, email servers, and/or other components. The applications (122A) may host other types of components without departing from the invention. An application (122A) may be executed on one or more client devices (e.g., 122, 124) as instances of the application.

The applications (122A) may be upgraded based on newer versions available for installation. The installation of application upgrades may be performed and/or otherwise initiated by the client device upgrade manager (100). The client device upgrade manager (100) may obtain upgrade estimations that specify the required estimated time that an application upgrade may take. The client device upgrade manager (100) may provide the upgrade estimated time and optimal time slots in which the application upgrade may be performed. The client device upgrade manager (100) may perform the method of FIG. 3D to perform the application upgrade.

In one or more embodiments of the invention, the application upgrade may further include functionality for monitoring device configuration information of the client devices (122, 124) such as operating system information, number of applications, current versions of such applications, processing power, memory capability, storage, etc. The device configuration information may be provided to the production host environment (130).

In one or more of embodiments of the invention, the applications (122A) are implemented as computer instructions, e.g., computer code, stored on a persistent storage that when executed by a processor(s) of a computing device cause the computing device to provide the functionality of the applications (122A) described throughout this application.

Figure 11:
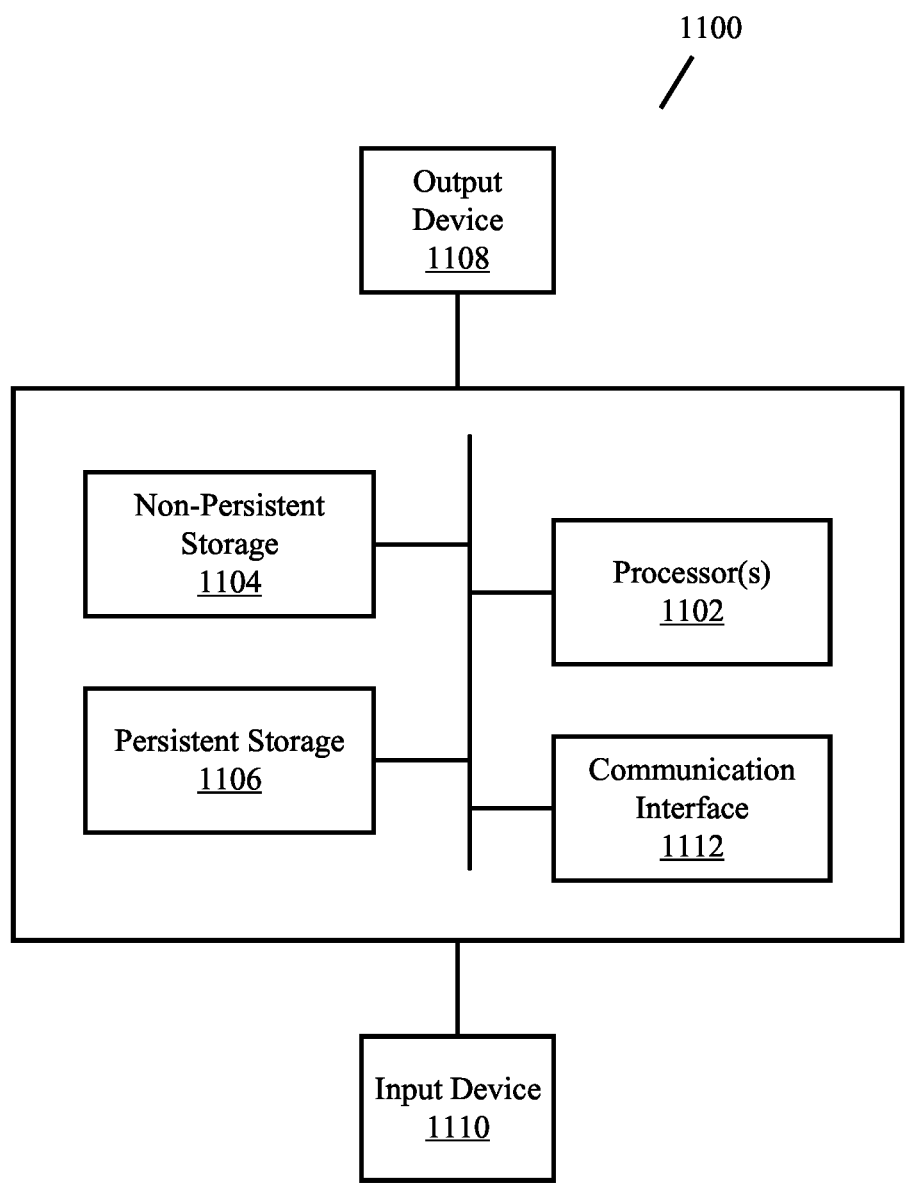
FIG. 11 shows a diagram of a computing device in accordance with one or more embodiments of the invention.

In one or more embodiments of the invention, the client device upgrade manager (100) is implemented as a computing device (see e.g., FIG. 11). The computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the client device upgrade manager (100) described throughout this application and/or all, or a portion thereof, of the methods illustrated in FIGS. 3A-3D.

In one or more embodiments of the invention, the client device upgrade manager (100) is implemented as a logical device. The logical device may utilize the computing resources of any number of computing devices and thereby provide the functionality of the client device upgrade manager (100) described throughout this application and/or all, or a portion thereof, of the methods illustrated in FIGS. 3A-3D.

In one or more embodiments of the invention, the production host environment (130) estimates the upgrade times and required reboots to perform the application upgrades. The production host environment (130) may include an application upgrade monitoring agent (132), an application upgrade repository (134), and a device emulation system (136). The production host environment (130) may include additional, fewer, and/or different components without departing from the invention.

In one or more embodiments of the invention, the application upgrade monitoring agent (132) monitors the application upgrade repository (134) to identify when a new version of an application upgrade is stored (e.g., by an application upgrade vendor (150)). The application upgrade monitoring agent (132), in response to a new application upgrade, performs the method of FIG. 3A to initiate an estimation of performing the application upgrade on one or more of the client devices (122, 124) in the client environment (120). The upgrade estimation(s) may be provided to the client device upgrade manager (100).

In one or more embodiments of the invention, the application upgrade monitoring agent (132) is implemented as a computing device (see e.g., FIG. 11). The computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the application upgrade monitoring agent (132) described throughout this application and/or all, or a portion thereof, of the methods illustrated in FIGS. 3A-3D.

In one or more embodiments of the invention, the application upgrade monitoring agent (132) is implemented as a logical device. The logical device may utilize the computing resources of any number of computing devices and thereby provide the functionality of the application upgrade monitoring agent (132) described throughout this application and/or all, or a portion thereof, of the methods illustrated in FIGS. 3A-3D.

In one or more embodiments of the invention, the application upgrade repository (134) stores versions of application upgrades. The application upgrade repository (134) may be updated by the application upgrade vendors (150) based on new versions of application upgrades being available. The application upgrade repository (134) may further include catalog files that specify the requirements of a client device in order for the application upgrade to be installed. The requirements may include, for example, a compatible device model, a minimum application version for the application upgrade to be installed, a compatible operating system (and corresponding version of such operating system), and an update sequence.

In one or more embodiments of the invention, the device emulation system (136) is a system of device emulation containers that may be configured to emulate a client device (122, 124). The emulation of the client devices may be used for performing the application upgrades on the emulated devices and measuring upgrade metrics such as time taken, number of reboots required, etc. For additional details regarding the device emulation system (136), see, e.g., FIG. 2.

In one or more embodiments of the invention, the device emulation system (136) is implemented as a computing device (see e.g., FIG. 11). The computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the device emulation system (136) described throughout this application and/or all, or a portion thereof, of the methods illustrated in FIGS. 3A-3D.

In one or more embodiments of the invention, the device emulation system (136) is implemented as a logical device. The logical device may utilize the computing resources of any number of computing devices and thereby provide the functionality of the device emulation system (136) described throughout this application and/or all, or a portion thereof, of the methods illustrated in FIGS. 3A-3D.

In one or more embodiments of the invention, the production host environment (130) is implemented as a computing device (see e.g., FIG. 11). The computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the production host environment (130) described throughout this application.

In one or more embodiments of the invention, the production host environment (130) is implemented as a logical device. The logical device may utilize the computing resources of any number of computing devices and thereby provide the functionality of the production host environment (130) described throughout this application.

In one or more embodiments of the invention, the application upgrade vendor (150) includes the functionality to obtain and provide application upgrade to the production host environment (130). The application upgrade vendor (150) may further include the functionality to add, remove, and modify application upgrades included in the application upgrade repository (134). The application upgrade vendor (150) may include other and/or additional functionalities without departing from the invention.

In one or more embodiments of the invention, the application upgrade vendor (150) is implemented as a computing device (see e.g., FIG. 11). The computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the application upgrade vendor (150) described throughout this application.

In one or more embodiments of the invention, the application upgrade vendor (150) is implemented as a logical device. The logical device may utilize the computing resources of any number of computing devices and thereby provide the functionality of the application upgrade vendor (150) described throughout this application.

In one or more embodiments of the invention, the state processor (160) includes the function to generate and train state prediction models. The state processor (160) may further include the functionality to generate state predictions using the state prediction models. The state processor (160) may include other and/or additional functionalities without departing from the invention. The state processor (160) may include the functionality to perform all, or a portion, of the methods of FIGS. 5A-5B.

In one or more embodiments of the invention, the state processor (160) is implemented as a computing device (see e.g., FIG. 11). The computing device may be, for example, a mobile phone, a tablet computer, a laptop computer, a desktop computer, a server, a distributed computing system, or a cloud resource. The computing device may include one or more processors, memory (e.g., random access memory), and persistent storage and/or storage devices (e.g., disk drives, solid state drives, etc.). The computing device may include instructions, stored on the persistent storage, that when executed by the processor(s) of the computing device cause the computing device to perform the functionality of the state processor (160) described throughout this application.

In one or more embodiments of the invention, the state processor (160) is implemented as a logical device. The logical device may utilize the computing resources of any number of computing devices and thereby provide the functionality of the state processor (160) described throughout this application.

In one or more embodiments of the invention, the predictor (170) includes the function to generate and train future state prediction models. The predictor (170) may further include the functionality to generate future state predictions using the future state prediction models. The predictor (170) may include other and/or additional functionalities without departing from the invention. The predictor (170) may include the functionality to perform all, or a portion, of the methods of FIGS. 7A-7B.

In one or more embodiments of the invention, the predictor (170) is implemented as a computing device (see e.g., FIG. 11). The computing device may be, for example, a mobile phone, a tablet computer, a laptop computer, a desktop computer, a server, a distributed computing system, or a cloud resource. The computing device may include one or more processors, memory (e.g., random access memory), and persistent storage and/or storage devices (e.g., disk drives, solid state drives, etc.). The computing device may include instructions, stored on the persistent storage, that when executed by the processor(s) of the computing device cause the computing device to perform the functionality of the predictor (170) described throughout this application.

In one or more embodiments of the invention, the predictor (170) is implemented as a logical device. The logical device may utilize the computing resources of any number of computing devices and thereby provide the functionality of the predictor (170) described throughout this application.

In one or more embodiments of the invention, the remediation orchestrator (180) includes the functionality to identify remediation steps to perform successful remediation of application upgrades that have failed. The remediation orchestrator (180) may include other and/or additional functionalities without departing from the invention. The remediation orchestrator (180) may include the functionality to perform all, or a portion, of the methods of FIGS. 9A-9B.

In one or more embodiments of the invention, the remediation orchestrator (180) is implemented as a computing device (see e.g., FIG. 11). The computing device may be, for example, a mobile phone, a tablet computer, a laptop computer, a desktop computer, a server, a distributed computing system, or a cloud resource. The computing device may include one or more processors, memory (e.g., random access memory), and persistent storage and/or storage devices (e.g., disk drives, solid state drives, etc.). The computing device may include instructions, stored on the persistent storage, that when executed by the processor(s) of the computing device cause the computing device to perform the functionality of the remediation orchestrator (180) described throughout this application.

In one or more embodiments of the invention, the remediation orchestrator (180) is implemented as a logical device. The logical device may utilize the computing resources of any number of computing devices and thereby provide the functionality of the remediation orchestrator (180) described throughout this application.

Figure 2:
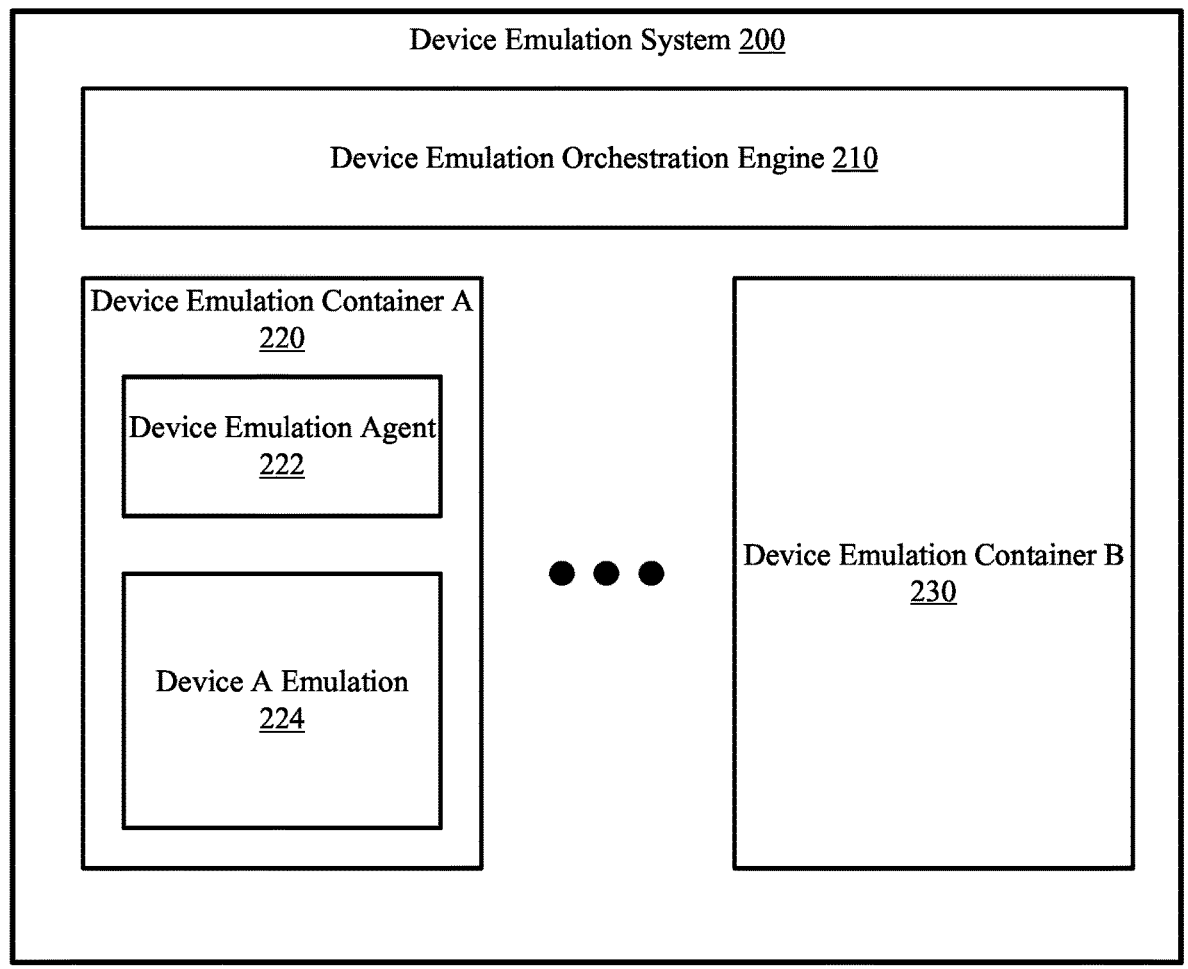
FIG. 2 shows a diagram of a device emulation system in accordance with one or more embodiments of the invention.

FIG. 2 shows a diagram of a device emulation system without departing from the invention. The device emulation system (200) may be an embodiment of the device emulation system (136, FIG. 1) discussed above. As discussed above, the device emulation system (200) emulates client devices. The device emulation system (200) may include a device emulation orchestration engine (210) and one or more device emulation containers (220, 230). The device emulation system (200) may include additional, fewer, and/or different components without departing from the invention.

In one or more embodiments of the invention, the device emulation orchestration engine (210) orchestrates the generation of the device emulation containers (220, 230). The device emulation orchestration engine (210) may obtain requests to emulate the application upgrade on an emulated device and to provide obtained upgrade estimations to the production host environment discussed above. The device emulation orchestration engine (210) may initiate the emulation of the devices and initiate the upgrades in accordance with FIG. 3B.

In one or more embodiments of the invention, the device emulation orchestration engine (210) is implemented as a computing device (see e.g., FIG. 11). The computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the device emulation orchestration engine (210) described throughout this application.

In one or more embodiments of the invention, the device emulation orchestration engine (210) is implemented as a logical device. The logical device may utilize the computing resources of any number of computing devices and thereby provide the functionality of the device emulation orchestration engine (210) described throughout this application.

In one or more embodiments of the invention, the device emulation containers (220) include a device emulation agent (222) that monitors the upgrades performed on an emulated device (224) of the device emulation container (220) to measure the time taken to perform each application upgrade and to track the number of reboots performed during the upgrade.

FIGS. 3A-3D show flowcharts in accordance with one or more embodiments of the invention. While the various steps in the flowcharts are presented and described sequentially, one of ordinary skill in the relevant art will appreciate that some or all of the steps may be executed in different orders, may be combined or omitted, and some or all steps may be executed in parallel. In one embodiment of the invention, the steps shown in FIGS. 3A-3D may be performed in parallel with any other steps shown in FIGS. 3A-3D, 5A-5B, 7A-7B, and/or 9A-9B without departing from the scope of the invention.

Figure 3A:
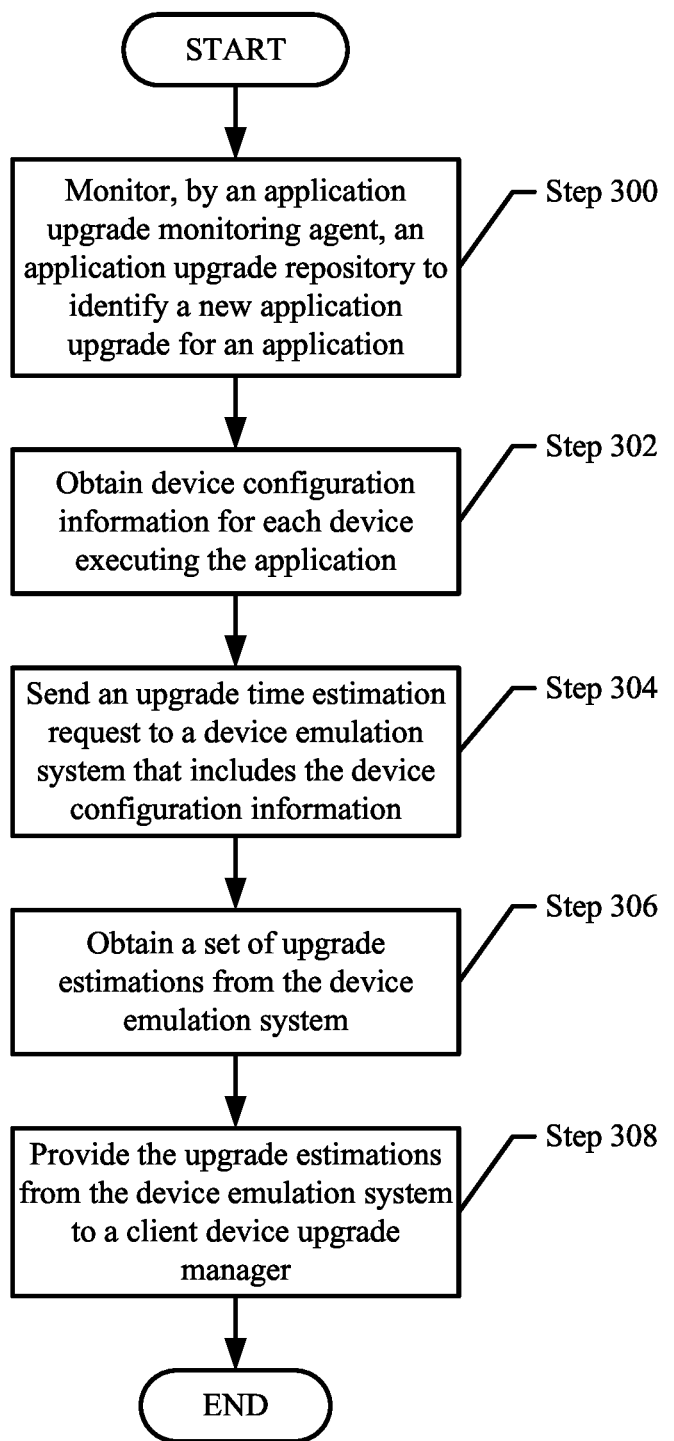
FIG. 3A shows a flowchart for managing an application upgrade based on a new application upgrade in accordance with one or more embodiments of the invention.

FIG. 3A shows a flowchart for managing an application upgrade based on a new application upgrade in accordance with one or more embodiments of the invention. The method shown in FIG. 3A may be performed by, for example, an application upgrade monitoring agent (e.g., 132, FIG. 1). Other components of the system illustrated in FIG. 1 may perform the method of FIG. 3A without departing from the invention.

Turning to FIG. 3A, in step 300, an application upgrade repository is monitored to identify a new application upgrade for an application. In one or more embodiments of the invention, the application upgrade repository is monitored to determine whether a change in the application upgrade repository has occurred. The change may be, for example, a new application upgrade has been stored in the application upgrade repository. The new application upgrade may be stored by an application vendor that generates application upgrades for an application.

In step 302, device configuration information is obtained for each device executing the application. In one or more embodiments of the invention, the device configuration information may be obtained from a client device upgrade manager. The device configuration information may be obtained prior to identifying the new application upgrade.

In one or more embodiments of the invention, the device configuration information specifies the configuration of a set of client devices that execute the application. The configuration may be associated with, for example, a current version of the operating system (OS) of the client device, the number of processors (e.g., central processing units (CPUs)), the amount of memory available for the client device, a number of applications executing on the client device, and the amount of available persistent storage of the client device. Other configurations may be specified in the device configuration information without departing from the invention.

In step 304, an upgrade time estimation request is sent to a device emulation system that includes the device configuration information. In one or more embodiments of the invention, the upgrade time estimation request specifies generating an upgrade estimation corresponding to performing the upgrade on each of a set of client devices on which the upgrade may be performed. The device configuration information may be provided with the upgrade time estimation request.

Figure 3B:
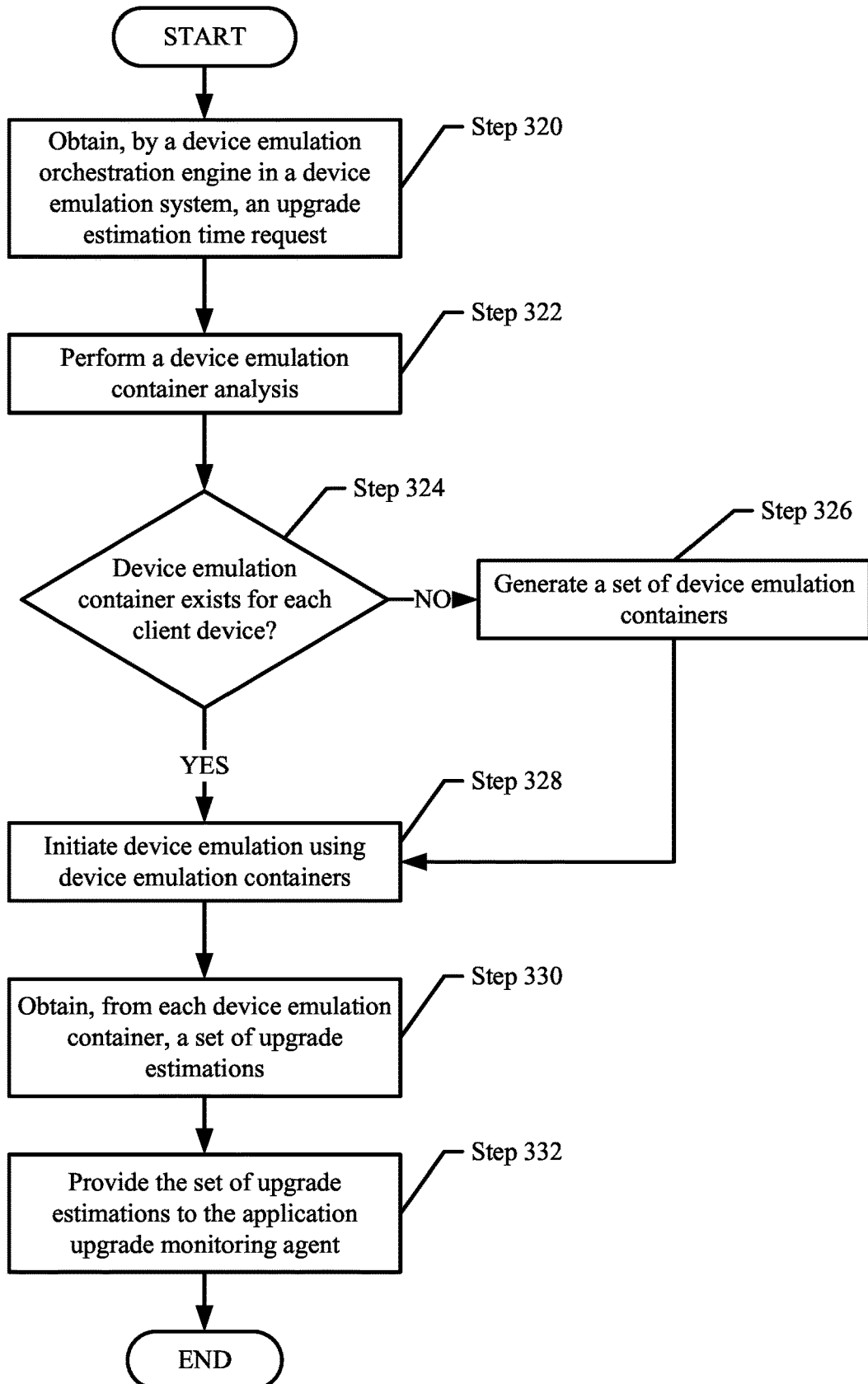
FIG. 3B shows a flowchart for performing a device emulation to obtain upgrade estimations in accordance with one or more embodiments of the invention.
Figure 3C:
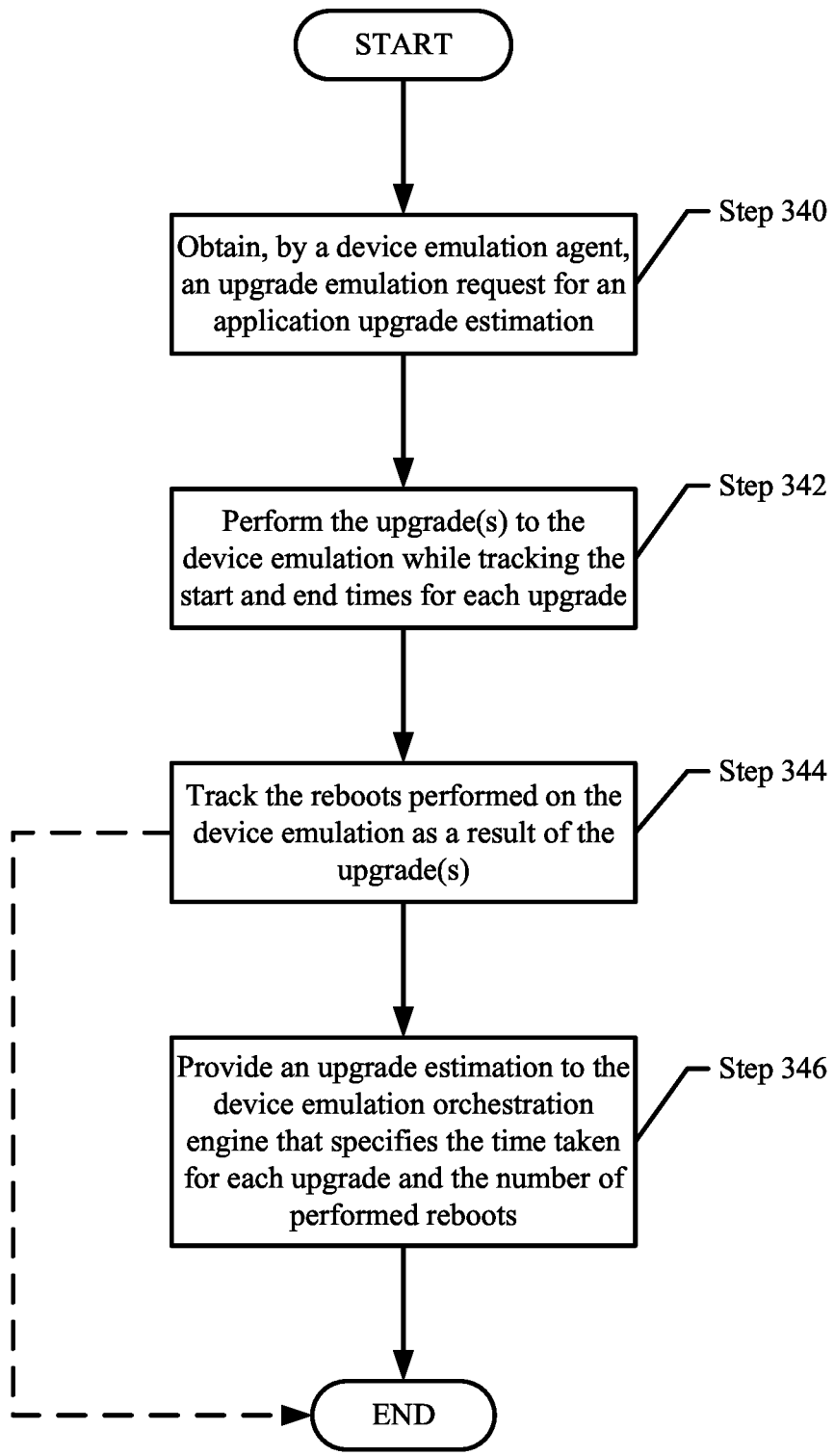
FIG. 3C shows a flowchart for tracking upgrade statistics in accordance with one or more embodiments of the invention.

In one or more embodiments of the invention, the device emulation system obtaining the upgrade time estimation request may perform the methods of FIG. 3B-3C to service the upgrade time estimation request. The upgrade time estimation request may be serviced via any other method without departing from the invention.

In step 306, a set of upgrade estimations is obtained from the device emulation system. In one or more embodiments of the invention, the set of upgrade estimations specifies a period of time estimated to take for an application upgrade to be installed in a client device. The set of upgrade estimations, collectively, may include the upgrade estimations for each client device in the set of client devices for which the upgrade is to be performed.

In step 308, the set of upgrade estimations is provided to a client device upgrade manager.

FIG. 3B shows a flowchart for performing a device emulation to obtain upgrade estimations in accordance with one or more embodiments of the invention. The method shown in FIG. 3B may be performed by, for example, a device emulation orchestration engine (e.g., 210, FIG. 2). Other components of the system illustrated in FIG. 1 or FIG. 2 may perform the method of FIG. 3B without departing from the invention.

In step 320, an upgrade estimation time request is obtained. In one or more embodiments of the invention, the upgrade estimation time request is obtained from the application upgrade monitoring agent discussed above. As discussed above, the upgrade estimation time request may specify generating an upgrade estimation corresponding to performing the upgrade on each of a set of client devices on which the upgrade may be performed. The upgrade estimation time request may include device configuration information.

In step 322, a device emulation container analysis is performed to determine a set of client devices that require an application upgrade. In one or more embodiments of the invention, the device emulation container analysis includes analyzing the obtained device configuration analysis to determine which client devices meet upgrade criteria. The upgrade criteria may include, for example, that a client device executes the application of the application upgrade, that the client device comprises the computing resources (e.g., storage, processing, etc.) to execute the application upgrade. Such criteria may be determined using catalog files (discussed in FIG. 1) that specify the requirements for installing the application upgrade.

In one or more embodiments of the invention, the device emulation container analysis further includes an analysis of the available and existing device emulation containers to determine, using the device configuration information, whether a device emulation container exists for each client device. Such determination may be performed by searching, for each client device that meets the upgrade criteria, for a device emulation container that is configured to emulate a device with similar configurations as that of the client device.

In step 324, a determination is made about whether a device emulation container exists for each client device in the set of client device. If a device emulation container exists for each client device, the method proceeds to step 328; otherwise, the method proceeds to step 326.

In step 326, a set of device emulation containers is generated using device configuration information specified in the upgrade estimation time request. In one or more embodiments of the invention, each device emulation container associated with a client device is generated by applying a set of computing resources to generate the device emulation container, and populating the device emulation container with an emulated device that is configured to emulate a computing device in accordance with the device configuration information of the client device. Further, the generated device emulation containers may include device emulation agents that monitor and initiate the upgrade emulations discussed below.

In step 328, an upgrade emulation is initiated using device emulation containers. The device emulation containers may include the device emulation containers identified in step 322. Further, the device emulation containers may include any device emulation containers generated in step 326.

In one or more embodiments of the invention, the upgrade emulations are initiated by sending upgrade emulation requests to a device emulation agent executing on each device emulation container. The upgrade emulation request specifies applying the application upgrade to an emulated device of the corresponding client device, and monitoring the installation of the application upgrade to obtain upgrade statistics. The upgrade statistics (discussed in FIG. 3C) may be used to generate upgrade statistics. The upgrade emulation request may further include the application upgrade (e.g., obtained from the application upgrade repository) and/or any intermediate application upgrades required to complete the application upgrade on each client device. The installation of the application upgrade may refer to the installation of the intermediate application upgrades in addition to the application upgrade that was identified in FIG. 3A.

In one or more embodiments of the invention, the upgrade emulation may be performed by each device emulation container in accordance with FIG. 3C. The upgrade emulation may be performed via any other method without departing from the invention.

In step 330, a set of upgrade estimations is obtained from each device emulation container. In one or more embodiments of the invention, the set of upgrade estimations specifies a period of time estimated for the application upgrade to take to complete on a client device. The upgrade estimations may each specify a number of reboots to be performed for each installation of an application upgrade.

In step 332, the set of upgrade estimations is provided to the application upgrade monitoring agent.

FIG. 3C shows a flowchart for tracking upgrade statistics in accordance with one or more embodiments of the invention. The method shown in FIG. 3C may be performed by, for example, a device emulation agent (e.g., 222, FIG. 2). Other components of the system illustrated in FIG. 1 or FIG. 2 may perform the method of FIG. 3C without departing from the invention.

In step 340, an upgrade emulation request is obtained from a device emulation orchestration engine. In one or more embodiments of the invention, the upgrade emulation request is obtained in response to an upgrade emulation request being sent in step 328 of FIG. 3B.

In step 342, the upgrades are performed to the emulated device while tracking the start and end times for each application upgrade. In one or more embodiments of the invention, the upgrade performed on the emulated device may include installing any number of intermediate application upgrades. For example, the emulated device may include a first version of an application. The application upgrade may require the installing an intermediate version of the upgrade for the application upgrade to be completely installed on the emulated device. The start and end times of each application upgrade, and any intermediate upgrades, may be tracked in step 342.

In step 344, the reboots performed on the emulated device during the application upgrades are tracked. In one or more embodiments of the invention, the reboots are tracked by implementing a counter that tracks the number of reboots performed for the application upgrade. Further, the start and end times of the reboots may be tracked to be included in the total time taken to complete the application upgrade.

In one or more embodiments of the invention, the reboots may be a requirement for the application upgrades. For example, one or more reboots may be performed for each application upgrade and/or intermediate application upgrades. Such required reboots may be considered expected reboots.

In one or more embodiments of the invention, during the installation of the application upgrade, an unexpected reboot may occur. Such unexpected reboot is a reboot that is not required, or otherwise not specified in the application upgrade. For example, the unexpected reboot may occur in response to a lack of available emulated computing resource of the emulated device. In such embodiments in which an unexpected reboot occurs in the emulated device, the device emulation agent monitoring the reboot may end the attempt of the installation of the application upgrade. Following this, the device emulation agent may send a notification to the device emulation orchestration engine that specifies the unexpected reboot. The device emulation orchestration engine, in response to the notification, may initiate notification of the failed attempt of the application upgrade on the emulated device to the client device, and the method may end following step 348.

In step 346, an upgrade estimation is provided to the device emulation orchestration engine. In one or more embodiments of the invention, the upgrade estimation specifies the time taken for each upgrade and the number of performed reboots.

Figure 3D:
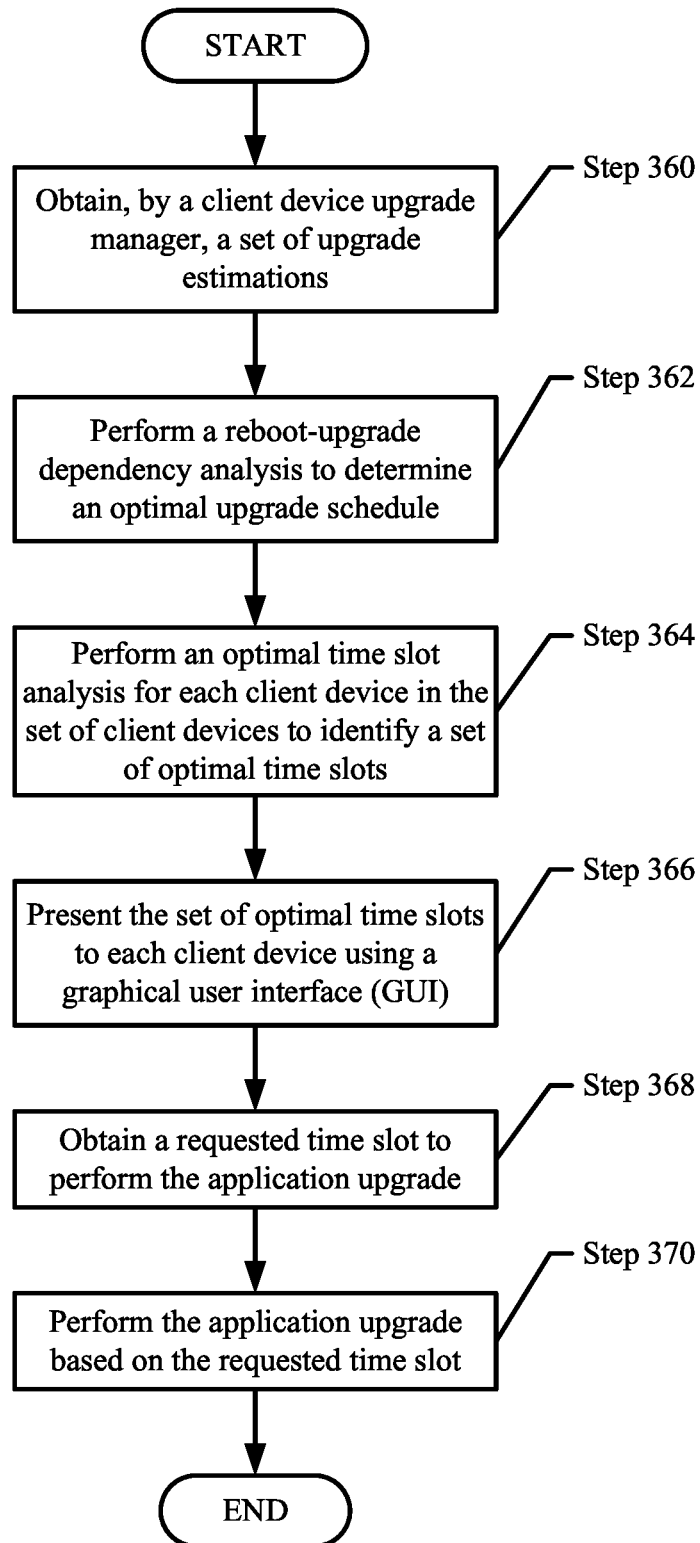
FIG. 3D shows a flowchart for performing an upgrade estimation and an application upgrade in accordance with one or more embodiments of the invention.

FIG. 3D shows a flowchart for performing an upgrade estimation and an application upgrade in accordance with one or more embodiments of the invention. The method shown in FIG. 3D may be performed by, for example, a client device upgrade manager (e.g., 100, FIG. 1). Other components of the system illustrated in FIG. 1 may perform the method of FIG. 3D without departing from the invention.

In step 360, a set of upgrade estimations is obtained. In one or more embodiments of the invention, the upgrade estimations are the upgrade estimations provided by the application upgrade monitoring agent in step 308 of FIG. 3A. The upgrade estimations may be generated in accordance with FIG. 3C discussed above.

In step 362, a reboot-upgrade dependency analysis is performed to determine an optimal upgrade schedule for each upgrade estimation. In one or more embodiments of the invention, the reboot-upgrade dependency analysis includes identifying, for each upgrade estimation, the number of reboots performed during the upgrade emulation, identifying the intermediate application upgrades performed, identifying the dependency of the intermediate application upgrades (e.g., whether a first intermediate application upgrade is required to be performed prior to a second intermediate application upgrade), and deriving the optimal upgrade schedule based on the identified reboots and dependencies.

In one or more embodiments of the invention, the reboot-dependency analysis derives the optimal upgrade schedule by identifying reboots that may be combined (e.g., performed concurrently) such that the total number of reboots are reduced.

For example, consider a scenario in which two application upgrades, independent of each other, may be performed on the client device. The first application upgrade may require one reboot, and the second application upgrade may require two reboots. In such example, the upgrade estimation may be based on three reboots being performed (e.g., each reboot being performed sequentially). The reboot-dependency analysis may result in the optimal upgrade schedule being based on performing the reboot of the first application upgrade with the first reboot of the second application upgrade. In this manner, the total number of reboots performed on the client device to install the two application upgrades may be reduced to two. Such combination of reboots for an installation of an application upgrade may be performed for all application upgrades of the installation on a client device. The reboot-dependency analysis may be performed for each upgrade estimation of the set of upgrade estimations.

In step 364, an optimal time slot analysis is performed for each client device in the set of client devices to identify a set of optimal time slots. In one or more embodiments of the invention, the optimal time slot analysis includes utilizing usage information of the client device to determine periods of time in the future that are predicted to be low usage. The usage information may specify, for example, a time series that specifies the usage of each computing resource of the client device over time. Such future periods of time may be predicted using, for example, a machine learning model that inputs the usage information and outputs a predicted set of periods of time in which the usage is predicted to be low. For example, the periods in time in which the usage is predicted to be low may relate to periods in time in which a user of the client device is not utilizing the client device and/or in which applications are not expected to be executing.

In one or more embodiments of the invention, the optimal time slot analysis further includes ranking the identified future periods of time based on expected preferences by the user of the client device. For example, the ranking may favor a period of time in which a user is likely to be sleeping. Such preferences may be determined by the client device upgrade manager or requested from the client device (e.g., prior to the methods of FIG. 3A-3D). The set of optimal time slots are identified for each client device.

In step 366, the set of optimal time slots are presented to each client device. In one or more embodiments of the invention, the optimal time slots are presented using a graphical user interface (GUI). The GUI may specify each of the set of optimal time slots based on their ranking as discussed above. For example, the higher-ranked optimal time slots may be presented first and/or at the top of the list. The GUI may be provided to the client device to enable a response from the client device in accordance with step 368 below.

In step 368, a requested time slot is obtained to perform the application upgrade for each client device. In one or more embodiments of the invention, the requested time slot may be obtained from the client device using the presented GUI discussed above.

For example, a first optimal time slot may be presented using the GUI. The client device may approve the first optimal time slot or request a new optimal time slot. A second optimal time slot may be presented, and the client device may select the second optimal time slot. When the second optimal time slot occurs, the client device may defer the application upgrade at the selected second optimal time slot. The GUI may provide the option to select a new optimal time slot or automatically initiate the application upgrade at a new optimal time slot. The result of this interaction may be referred to as the requested time slot.

In one or more embodiments of the invention, the requested time slot is obtained for each client device.

In step 370, the application upgrade is performed based on the requested time slot. In one or more embodiments of the invention, the application upgrade is performed in accordance with the installation of the application upgrade and each intermediate application upgrade. The reboots associated with each application upgrade and/or intermediate application upgrade may be combined in accordance with the reboot-dependency analysis discussed above.

First Example

Figure 4A:
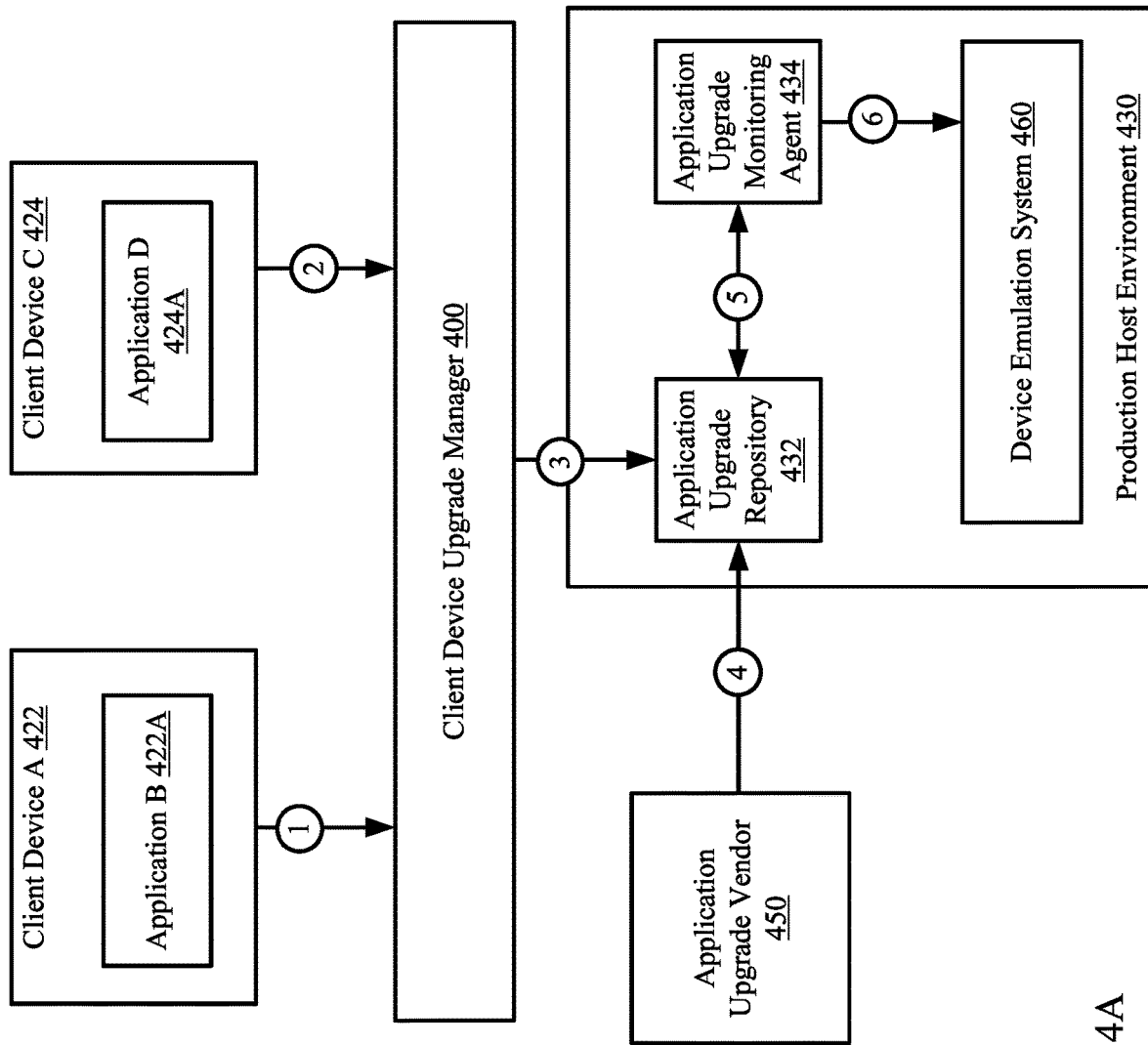
FIGS. 4A-4C show a first example in accordance with one or more embodiments of the invention.
Figure 4B:
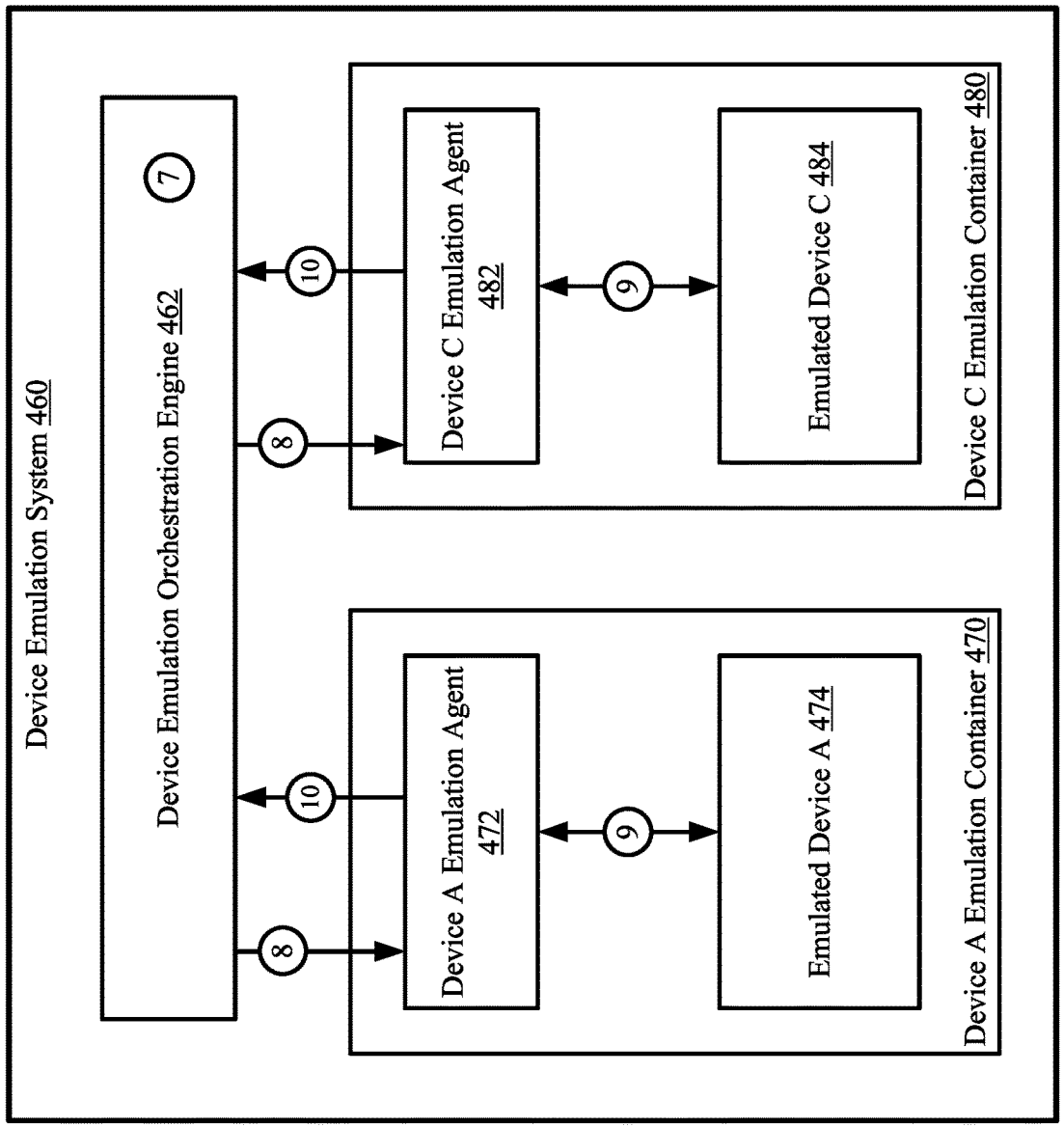
Figure 4C:
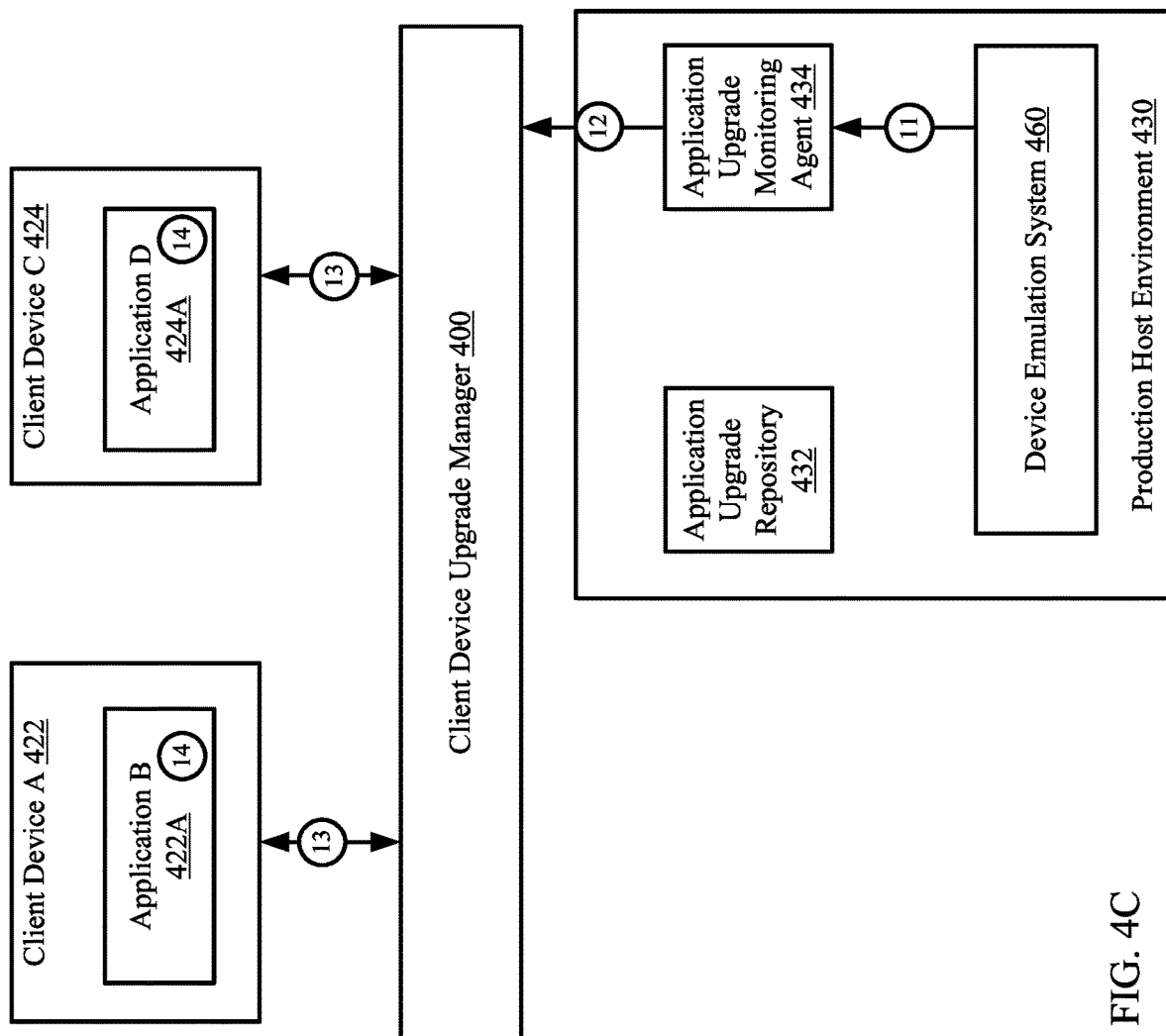

The following section describes a first example. The example, illustrated in FIGS. 4A-4C, is not intended to limit the invention and is independent from any other examples discussed in this application. Turning to the example, consider a scenario in which an upgrade estimation time is performed for an application executing on two client devices.

Turning to the example, FIG. 4A shows a diagram of an example system. For the sake of brevity, not all components of the example system may be illustrated in FIG. 4A. The example system may include two client devices (client device A (422) and client device C (424)). Client device A (422) executes application B (422A), and client C (424) executes application D (424A). For clarity, each of the applications (422A, 424A) may be instances of the same application.

A client device upgrade manager (400) obtains device configuration information from each of client device A (422) [1] and client device C (424) [2]. The client device upgrade manager (400) stores configuration files each corresponding to the device configuration information of client devices A (422) and C (424) in an application upgrade repository (432) of a production host environment (430) [3].

At a later time, an application upgrade vendor (450) stores a new application upgrade in the application upgrade repository (432) [4]. The new application upgrade relates to the applications (422A, 424A) executing on client devices A (422) and C (424). An application upgrade monitoring agent (434) monitoring the application upgrade repository (432) identifies the new application upgrade [5]. The application upgrade monitoring agent (434), in response to identifying the new application upgrade, sends an upgrade estimation request to a device emulation system (460). The upgrade time estimation request includes the device configuration information of both client devices A (422) and C (424).

FIG. 4B shows a diagram of the device emulation system at a later point in time. For the sake of brevity, not all components of the example system may be illustrated in FIG. 4B. A device emulation orchestration engine (462) of the device emulation system (460) obtains the upgrade estimation time request and performs a device emulation container analysis as discussed in FIG. 3B to identify device emulation containers to perform the upgrade emulations [7]. The upgrade estimation time request includes the device configuration information of client devices A and C. The device emulation orchestration engine (462), in response to the device emulation container analysis, and using the device configuration information, identifies device A emulation container (470) that emulates device A in accordance with the device configuration information, and device C emulation container (480) that, similarly, emulates device C. Following the identification, the device emulation orchestration engine (462) sends upgrade emulation requests to a device emulation agent (472, 482) of each device emulation container (470, 480) [8].

Device A emulation agent (472), in response to the upgrade emulation request, performs the method of FIG. 3C to perform the upgrade emulation on an emulated device A (474) [9]. Similarly, device C emulation agent (472), in response to the upgrade emulation request, performs the method of FIG. 3C to perform the upgrade emulation on an emulated device C (484) [9]. The device emulation agents (472, 482) monitor their respective upgrade emulations to track the start times and end times of each application upgrade and the number of reboots performed for each application upgrade.

In this example, emulated device A (474) requires the installation of a prior version of the application upgrade before installing the application upgrade. One reboot is performed for each of the new application upgrade and the prior version of the application upgrade. Further, only the new application upgrade was installed in emulated device C (484), and only one total reboot is performed on emulated device C (484). Each of the aforementioned reboots are tracked by their respective device emulation agents (472, 482).

Following the completions of each of the respective upgrade emulations, the device emulation agents (472, 482) each generate an upgrade estimation. The set of upgrade estimations is provided to the device emulation orchestration agent (462) [10].

FIG. 4C shows a diagram of the example system at a later point in time. For the sake of brevity, not all components of the example system may be illustrated in FIG. 4C. Following the generation of the set of upgrade estimations, the device emulation system (460) provides the set of upgrade estimations to the application upgrade monitoring agent (434) [11]. The application upgrade monitoring agent (434) provides the set of upgrade estimations to the client device upgrade manager (400) [12].

In response to obtaining the set of upgrade estimations, the client device upgrade manager (400) performs the reboot-dependency analysis as discussed in FIG. 3D to determine an optimal upgrade schedule. Using the optimal upgrade schedule and using usage information of the client devices (422, 424) previously obtained, the client device upgrade manager (400) generates a set of optimal time slots for each client device (422, 424) that specifies a ranked list of optimal time slots that the application upgrade may be installed in the respected client devices (422, 424).

The client device upgrade manager (400), utilizing the generated set of optimal time slots, communicates with each client device (422, 424) independently to obtain a requested time slot for the respective application upgrades [13]. Specifically, the client device upgrade manager (400) presents a GUI to client device A (422) that specifies a ranking of one set of optimal time slots corresponding to client device A (422). The client device (422), using the GUI, selects a first time slot and provides the selection to the client device upgrade manager (400) as its requested time slot. Similarly, the client device upgrade manager (400) presents a second GUI to client device C (424) that specifies a ranking of a second set of optimal time slots corresponding to client device C (424). The client device (424), using the second GUI, selects a time slot and provides the selection to the client device upgrade manager (400) as its requested time slot.

After obtaining the requested time slots, the client device upgrade manager (400) initiates the installation of the application upgrades in the respective client devices (422, 424) [14]. Specifically, application B (422A) is upgraded at its respective requested time slot. Alternatively, an attempt to perform the upgrade on application D (424A) is initiated at its respective requested time slot. Client device C (424) sends a request to defer the application upgrade to a later time slot. The client device upgrade manager (400), in response to the request, defers the application upgrade to the later time slot. After such application upgrades are installed, application B (422A) and application D (424A) are upgraded.

End of First Example

Figure 5A:
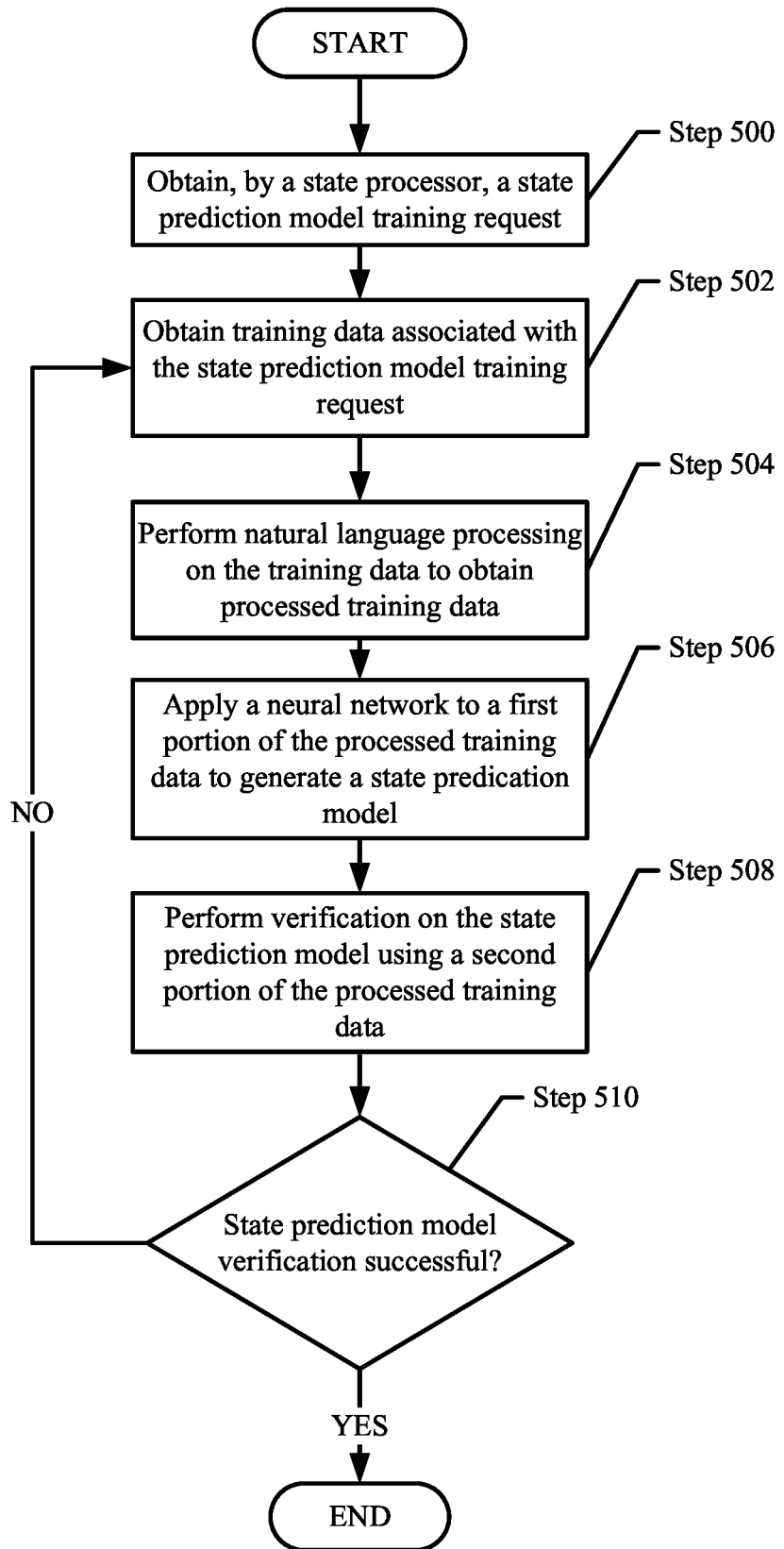
FIG. 5A shows a flowchart for training a state prediction model in accordance with one or more embodiments of the invention.
Figure 5B:
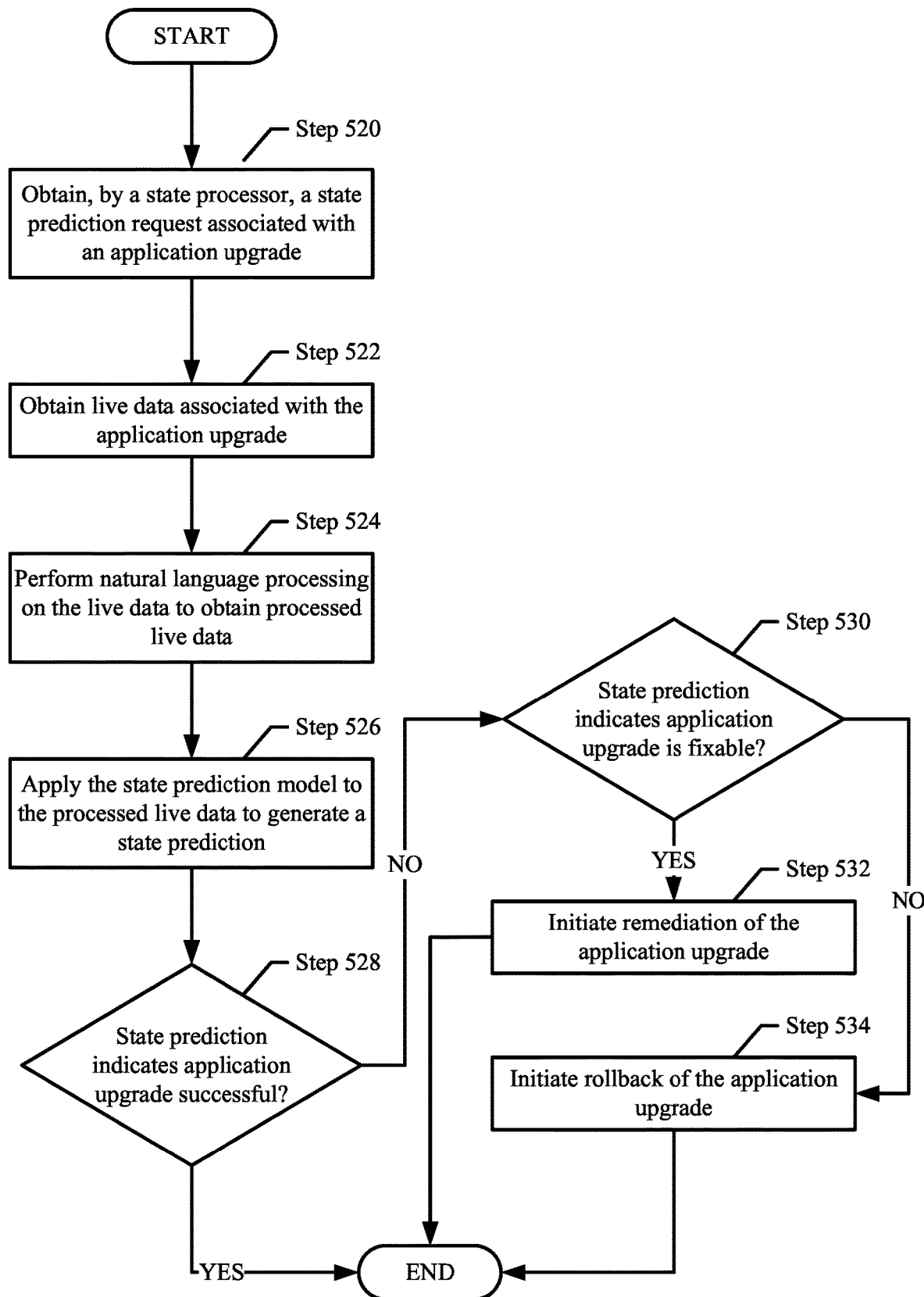
FIG. 5B shows a flowchart for generating a state prediction in accordance with one or more embodiments of the invention.

FIGS. 5A-5B show flowcharts in accordance with one or more embodiments of the invention. While the various steps in the flowcharts are presented and described sequentially, one of ordinary skill in the relevant art will appreciate that some or all of the steps may be executed in different orders, may be combined or omitted, and some or all steps may be executed in parallel. In one embodiment of the invention, the steps shown in FIGS. 5A-5B may be performed in parallel with any other steps shown in FIGS. 3A-3D, 5A-5B, 7A-7B, and/or 9A-9B without departing from the scope of the invention.

FIG. 5A shows a flowchart for managing an application upgrade based on a new application upgrade in accordance with one or more embodiments of the invention. The method shown in FIG. 5A may be performed by, for example, a state processor (e.g., 160, FIG. 1). Other components of the system illustrated in FIG. 1 may perform the method of FIG. 5A without departing from the invention.

Turning to FIG. 5A, in step 500, a state prediction model training request is obtained by the state processor. In one or more embodiments of the invention, the state processor obtains a message. The message may include a request to generate a state prediction model. The message may be obtained from the application upgrade monitoring agent, a client device, a user (e.g., a system administrator), and/or other and/or additional components illustrated in the system of FIG. 1 without departing from the invention. The message may be provided to state processor based on a training schedule, as the state processor may generate and/or refine state prediction models over time as new training data becomes available.

The training schedule may be one or more data structures that specify points in time and/or state prediction model generation trigger events (e.g., state prediction model verification failure, new training data available, etc.), the occurrence of which may trigger a request to generate a state prediction model to be sent to the state processor. The training schedule may be maintained by the application upgrade monitoring agent and/or a user of the system. The application upgrade monitoring agent may monitor the training schedule and submit requests to generate state prediction models based on the training schedule.

The message may be provided to the state processor using any appropriate method of data transmission without departing from the invention. As an example, the message may be transmitted as data packets through one or more network devices that operatively connect the state processor to the application upgrade monitoring agent and/or a user. The state prediction model training request may be obtained by the state processor via other and/or additional methods without departing from the invention.

In step 502, training data associated with the state prediction model training request is obtained. As discussed above, the state processor may obtain a message that includes the state prediction model training request. The message may further include training data to be used to train and generate the state prediction model. The state processor may obtain the training data associated with the state prediction model training request by parsing the message and identifying the training data.

In other embodiments of the invention, the message obtained in step 500 may include training data identifiers (e.g., file identifiers, data chunk identifiers, etc.) and/or storage locations (e.g., pointers, storage addresses, etc.) associated with training data to be used to generate the state prediction model. If the storage location is associated with a storage device that is not operatively connected to the state processor, then the message may further include communication information (e.g., network addresses, identifiers, encryption keys, etc.) that may be used to request and obtain the training data. The state processor may use the storage location and, if necessary, the identification information and the communication information to obtain the training data associated with the state prediction model training request. The training data associated with the state prediction model training request may be obtained via other and/or additional methods without departing from the invention.

The training data may be one or more data structures that include data that may be used to train and generate state prediction models. The training data may include log information (e.g., log files) associated with application upgrades and the states associated with the log information. The training data may include other and/or additional information associated with application upgrades (e.g., application upgrade identifies, application upgrade versions, application types, etc.) without departing from the invention. The application upgrade monitoring agent may maintain the training data. The training data may be updated by the application upgrade monitoring agent and/or a user (e.g., a system administrator) with log information and corresponding states over time.

In step 504, natural language processing is performed on the training data to obtain processed training data. As discussed above, the training data may include log information associated with previous application upgrades. The log information may include one or more sentences of human readable text descriptive of previous application upgrades. The state processor may perform natural language processing by performing tokenization on the log information included in the training data.

Tokenization, as used herein, may refer to separating the sentences of the log information included in the training data into each separate word of the sentence. The state processor may identify each word of each sentence included in the log information of the training data. Additionally, the state processor may assign a number to each word, with instances of the same word being assigned the same number. The state processor may maintain mappings between words and assigned numbers. The state processor may use the mappings to assign instances of words with the corresponding numbers. Each number representing a word in a sentence may be referred to as a token. And the collection of tokens associated with a particular sentence may be referred to as a sequence. The state processor may perform tokenization (i.e., generate sequences of tokens) using other and/or additional methods without departing from the invention.

In addition to performing tokenization, the state processor may also pad the sequences of tokens. In other words, the state processor may include one or more generic or null tokens (e.g., zero) in sequences of tokens in order to ensure that all sequences of tokens include the same length (i.e., each sequence includes the same number of tokens). As a result, the padded sequences of tokens may be in a form usable by a prediction algorithm to generate a state prediction model. The padded sequences of tokens may be referred to as processed training data. Natural language processing may be performed on the training data to obtain processed training data via other and/or additional methods without departing from the invention.

In step 506, a neural network is applied to a first portion of the processed training data to generate a state prediction model. In one or more embodiments of the invention, the state processor applies the neural network to a first portion of the processed training data to generate the state prediction model. The state processor may split the processed training data into two portions, the first portion may input into the neural network to generate the state prediction model. The first portion of the processed training data may include any portion of the processed training data without departing from the invention. The state processor may introduce to the neural network to the first portion of the training processed training data to generate the state prediction model. The state processor may perform any appropriate method of model training to generate the state prediction model. As a result, the state prediction model may be generated. The neural network may include an embedding layer and a global average pooling layer.

The embedding layer may represent the tokens included in the processed data as multi-dimensional vectors. The state processor may also perform global average pooling to sum up the multi-dimensional vectors. The neural network may include other and/or additional layers without departing from the invention. The state processor may perform other and/or additional state prediction model training methods (e.g., optimization) without departing from the invention. The neural network may be applied to the first portion of the processed training data to generate a state prediction model via other and/or additional methods without departing from the invention.

In step 508, verification is performed on the state prediction model using a second portion of the processed training data. In one or more embodiments of the invention, the state processor generates verification state predictions by applying the state prediction model to the second portion of the processed training data. The state processor may compare the verification state predictions with the states included in the second portion of the processed training data. When comparing the verification state predictions with the states included in the second portion of the processed training data, the state processor may calculate the error (e.g., the average percentage error associated with all verification state predictions) between the verification state predictions and the states included in the second portion of the processed data. Verification may be performed on the state prediction model using the second portion of the processed data via other and/or additional methods without departing from the invention.

In step 510, a determination is made as to whether the state prediction model verification is successful. As discussed above, the state processor may calculate the error when performing verification on the state prediction model. The state processor may include or otherwise have access to an error threshold. The error threshold may be an error value over which the performance of the state prediction model is inadequate and the state prediction model verification is not successful. The state processor may compare the error with the error threshold. If the error exceeds the error threshold, the state processor may determine that the state prediction model verification is not successful. If the error does not exceed the error threshold, then the state processor may determine that the state prediction model verification is successful. The determination as to whether the state prediction model verification is successful may be made via other and/or additional methods without departing from the invention.

In one or more embodiments of the invention, if it is determined that the state prediction model verification is successful, then the method ends following step 510. In one or more embodiments of the invention, if it is determined that the state prediction model verification is not successful, then the method proceeds to step 502. In such a scenario, additional training data may be obtained in step 502 and steps 504, 506, 508, and 510 may be repeated to increase the performance of the state prediction model. Steps 502, 506, 508, and 510 may be repeated any number of times without departing from the invention.

FIG. 5B shows a flowchart for generating a state prediction in accordance with one or more embodiments of the invention. The method shown in FIG. 5B may be performed by, for example, a state processor (e.g., 160, FIG. 1). Other components of the system illustrated in FIG. 1 may perform the method of FIG. 5B without departing from the invention.

Turning to FIG. 5B, in step 520, a state prediction request associated with an application upgrade is obtained by the state processor. In one or more embodiments of the invention, the state processor obtains a message. The message may include a request to generate a state prediction. The message may be obtained from the application upgrade monitoring agent. The message may be provided to state processor after an application upgrade is performed in the device emulation system.

The message may be provided to the state processor using any appropriate method of data transmission without departing from the invention. As an example, the message may be transmitted as data packets through one or more network devices that operatively connect the state processor to the application upgrade monitoring agent. The state prediction request may be obtained by the state processor via other and/or additional methods without departing from the invention.

In step 522, live data associated with the application upgrade is obtained. As discussed above, the state processor may obtain a message that includes the state prediction request. The message may further include live data associated with the application upgrade for which the state prediction is to be generated. The state processor may obtain the live data associated with the state prediction request by parsing the message and identifying the live data.

In other embodiments of the invention, the message obtained in step 520 may include live data identifiers (e.g., file identifiers, data chunk identifiers, etc.) and/or storage locations (e.g., pointers, storage addresses, etc.) associated with the live data to be used to generate the state prediction. If the storage location is associated with a storage device that is not operatively connected to the state processor, then the message may further include communication information (e.g., network addresses, identifiers, encryption keys, etc.) that may be used to request and obtain the live data. The state processor may use the storage location and, if necessary, the identification information and the communication information to obtain the live data associated with the state prediction request. The live data associated with the state prediction request may be obtained via other and/or additional methods without departing from the invention.

The live data may be one or more data structures that include data that may be used to generate state predictions. The live data may include log information (e.g., log files) associated with the application upgrade for which the state prediction is to be generated. The live data may include other and/or additional information associated with application upgrade (e.g., application upgrade identifier, application upgrade version, application types etc.) without departing from the invention. The device emulation agent associated with the application may generate the live data during the performance of the application upgrade on the emulated device.

In step 524, natural language processing is performed on the live data to obtain processed live data. As discussed above, the live data may include log information associated with the application upgrade for which the state prediction is to be generated. The log information may include one or more sentences of human readable text descriptive of the application upgrade. The state processor may perform natural language processing by performing tokenization on the log information included in the live data.

Tokenization, as used herein, may refer to separating the sentences of the log information included in the live data into each separate word of the sentence. The state processor may identify each word of each sentence included in the log information of the live data. Additionally, the state processor may assign a number to each word, with instances of the same word being assigned the same number. The state processor may maintain mappings between words and assigned numbers. The state processor may use the mappings to assign instances of words with the corresponding numbers. Each number representing a word in a sentence may be referred to as a token. And the collection of tokens associated with a particular sentence may be referred to as a sequence. The state processor may perform tokenization (i.e., generate sequences of tokens) using other and/or additional methods without departing from the invention.

In addition to performing tokenization, the state processor may also pad the sequences of tokens. In other words, the state processor may include one or more generic or null tokens (e.g., zero) in sequences of tokens in order to ensure that all sequences of tokens include the same length (i.e., each sequence includes the same number of tokens). As a result, the padded sequences of tokens may be in a form usable by a prediction algorithm to generate a state prediction. The padded sequences of tokens may be referred to as processed live data. Natural language processing may be performed on the live data to obtain processed live data via other and/or additional methods without departing from the invention.

In step 526, the state prediction model is applied to the processed live data to generate a state prediction. The state processor may input the processed live data into the state prediction model to generate a state prediction. The state prediction may include a two dimensional vector associated with the state of the application upgrade corresponding to the live data. The prediction model may be applied to the processed live data to generate the state prediction via other and/or additional methods without departing from the invention.

In step 528, a determination is made as to whether the state prediction indicates that the application upgrade is successful. As discussed above, the state prediction may include a two-dimensional vector. A state prediction associated with a successful application upgrade may include one or more successful application upgrade vectors (i.e., magnitudes and directions) in the two dimensional vector space. In other words, in the two dimensional vector space, there may be a successful application upgrade subspace including the one or more successful application upgrade vectors indicating that the application upgrade is successful. The state processor may check the generated state prediction to determine whether the state prediction matches the successful application upgrade vector(s) (i.e., the state prediction is included in the successful application upgrade subspace). If the state processor determines that the state prediction matches the successful application upgrade vector(s), then the state processor may determine that the state prediction indicates that the application upgrade is successful. If the state processor determines that the state prediction does not match the successful application upgrade vector(s), then the state processor may determine that the state prediction indicates that the application upgrade is not successful. The determination as to whether the state prediction indicates that the application upgrade is successful may be made via other and/or additional methods without departing from the invention.

In one or more embodiments of the invention, if it is determined that the state prediction indicates that the application upgrade is successful, then the method ends following step 528. In one or more embodiments of the invention, if it is determined that the state prediction indicates that the application upgrade is not successful, then the method proceeds to step 530.

In step 530, a determination is made as to whether the state prediction indicates that the application upgrade is fixable. As discussed above, the state prediction may include a two-dimensional vector. A state prediction associated with a fixable application upgrade may include one or more successful application upgrade vectors (i.e., magnitudes and directions) in the two dimensional vector space. In other words, in the two dimensional vector space, there may be a fixable application upgrade subspace including the one or more application upgrade vectors indicating that the application upgrade is fixable. The state processor may check the generated state prediction to determine whether the state prediction matches one of the fixable application upgrade vector(s) (i.e., the state prediction is included in the fixable application upgrade subspace). If state processor determines that the state prediction matches fixable application upgrade vector(s), then the state processor may determine that the state prediction indicates that the application upgrade is fixable. If the state processor determines that the state prediction does not match a fixable application upgrade vector(s), then the state processor may determine that the state prediction indicates that the application upgrade is not fixable and a rollback is required. The determination as to whether the state prediction indicates that the application upgrade is fixable may be made via other and/or additional methods without departing from the invention.

In one or more embodiments of the invention, if it is determined that the state prediction indicates that the application upgrade is fixable, then the method proceeds to step 532. In one or more embodiments of the invention, if it is determined that the state prediction indicates that the application upgrade is not fixable, then the method proceeds to step 534.

In step 532, remediation of the application upgrade is initiated. In one or more embodiments of the invention, the state processor sends a message to the application upgrade monitoring agent. The message may include the state prediction and a request to remediate the application upgrade. The message may include other and/or additional information without departing from the invention.

The message may be sent to the application upgrade monitoring agent using any appropriate method of data transmission without departing from the invention. As an example, the message may be transmitted as data packets through one or more network devices that operatively connect the state processor to the application upgrade monitoring agent. In response to obtaining the message, the application upgrade monitoring agent may initiate the remediation of the application upgrade based on the state prediction. For additional information regarding remediation of application upgrades, refer to FIGS. 9A-9B. Remediation of the application upgrade may be initiated via other and/or additional methods without departing from the invention.

In step 534, rollback of the application upgrade is initiated. In one or more embodiments of the invention, the state processor sends a message to the application upgrade monitoring agent. The message may include the state prediction and a request to roll back the application upgrade. The message may include other and/or additional information without departing from the invention.

The message may be sent to the application upgrade monitoring agent using any appropriate method of data transmission without departing from the invention. As an example, the message may be transmitted as data packets through one or more network devices that operatively connect the state processor to the application upgrade monitoring agent. In response to obtaining the message, the application upgrade monitoring agent may initiate the rollback of the application upgrade based on the state prediction. After rolling back the application upgrade, the application upgrade monitoring agent may notify the client device upgrade manager or a user of the client device associated with the application upgrade that the application upgrade was not successful in the device emulation system. Rollback of the application upgrade may be initiated via other and/or additional methods without departing from the invention.

In one or more embodiments of the invention, the method ends following step 534.

Second Example

Figure 6A:
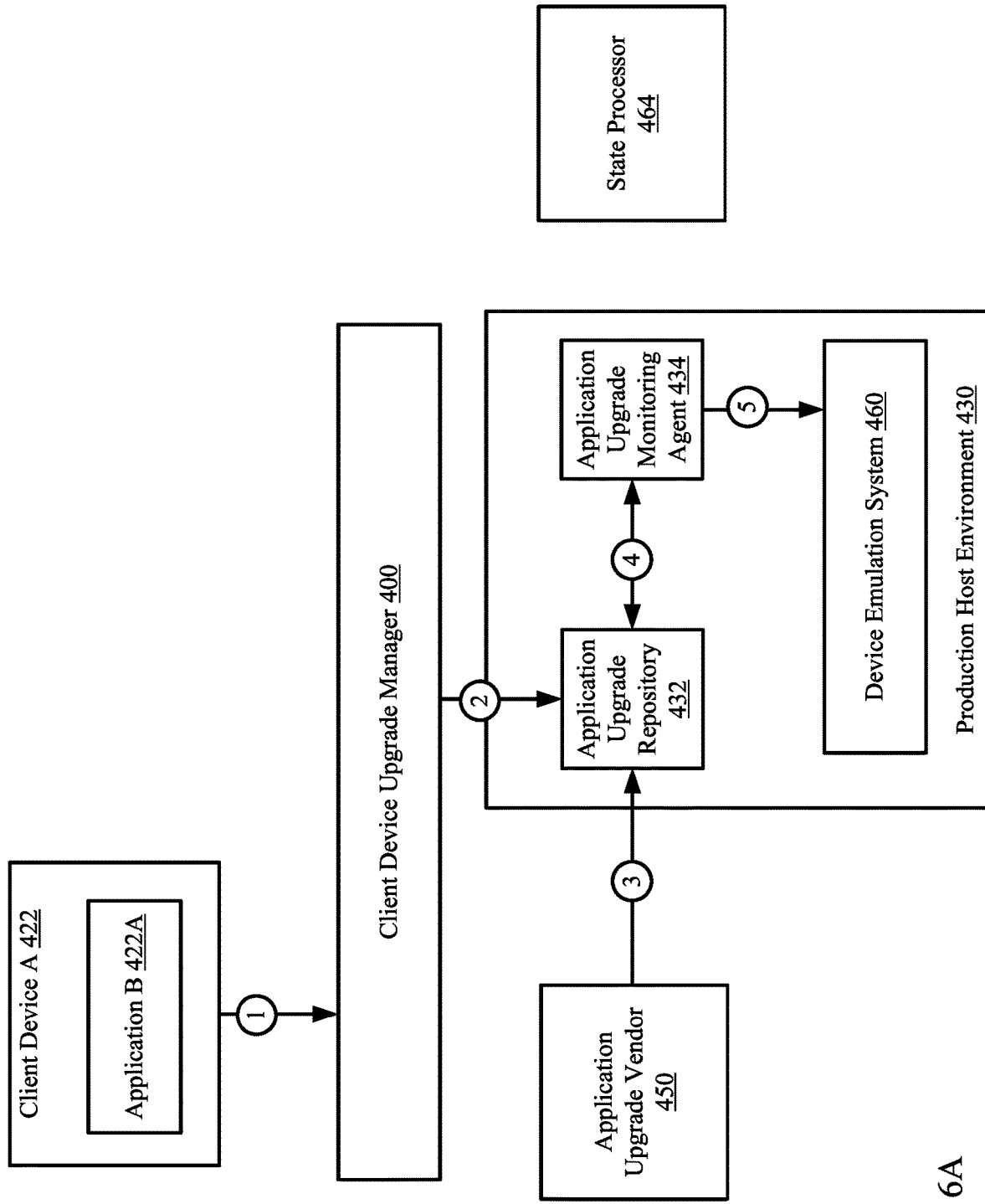
FIGS. 6A-6C show a second example in accordance with one or more embodiments of the invention.
Figure 6B:
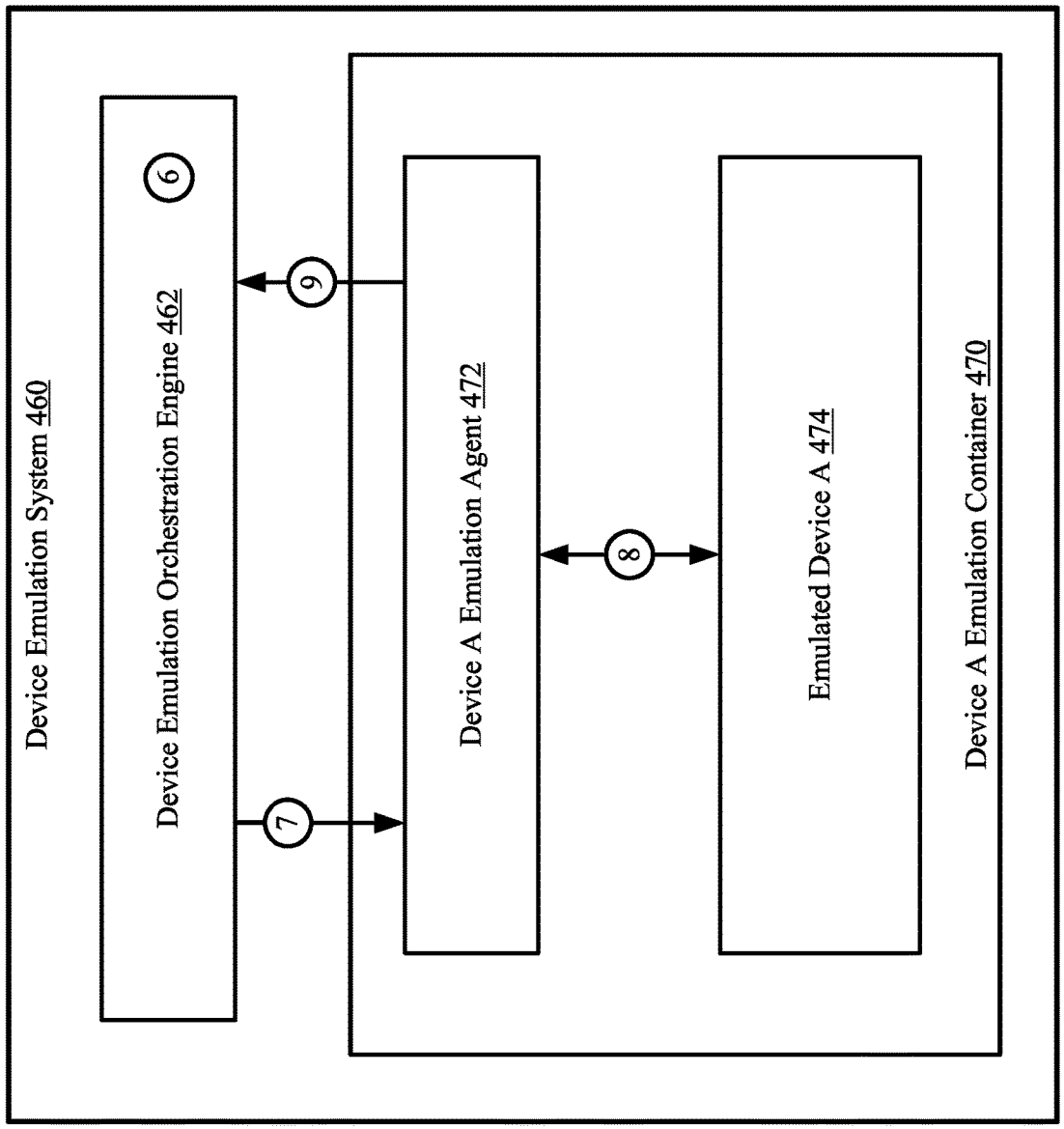
Figure 6C:
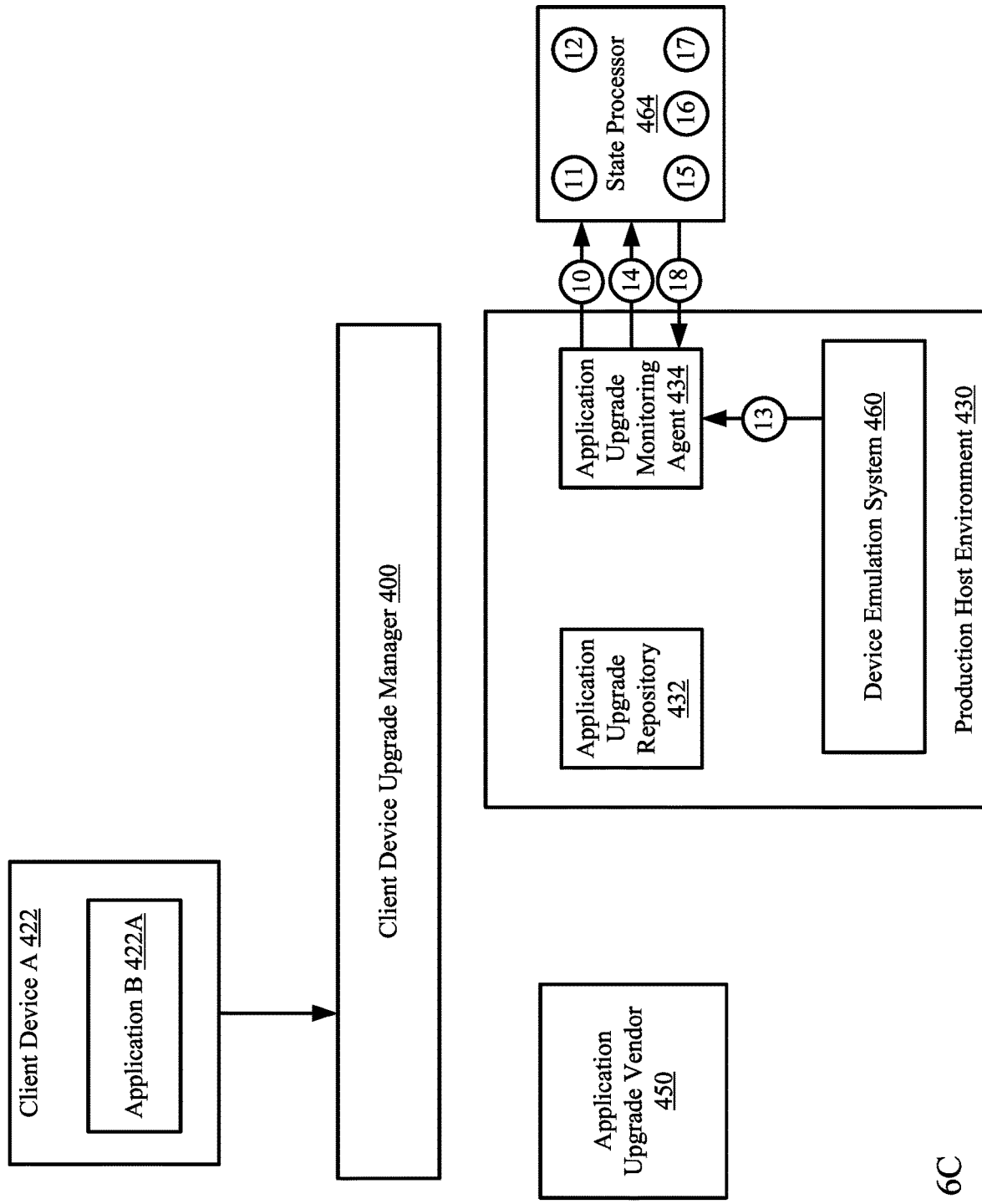

The following section describes a Second example. The second example, illustrated in FIGS. 6A-6C, is not intended to limit the invention and is independent from any other examples discussed in this application. Turning to the second example, consider a scenario in which a state prediction is generated for application upgrade associated with an application executing on a client device.

Turning to the example, FIG. 6A shows a diagram of an example system. For the sake of brevity, not all components of the example system may be illustrated in FIG. 6A. The example system may include client device A (422). Client device A (422) executes application B (422A).

A client device upgrade manager (400) obtains device configuration information from client device A (422) [1]. The client device upgrade manager (400) stores configuration files corresponding to the device configuration information of client device A (422) in an application upgrade repository (432) of a production host environment (430) [2].

At a later time, an application upgrade vendor (450) stores a new application upgrade in the application upgrade repository (432) [3]. The new application upgrade relates to the application (422A) executing on client device A (422). An application upgrade monitoring agent (434) monitoring the application upgrade repository (432) identifies the new application upgrade [4]. The application upgrade monitoring agent (434), in response to identifying the new application upgrade, sends an upgrade request to a device emulation system (460) [5]. The upgrade request includes the device configuration information of client device A (422).

FIG. 6B shows a diagram of the device emulation system at a later point in time. For the sake of brevity, not all components of the example system may be illustrated in FIG. 6B. A device emulation orchestration engine (462) of the device emulation system (460) obtains the upgrade request and performs a device emulation container analysis as discussed in FIG. 3B to identify device emulation containers to perform the upgrade emulations [6]. The upgrade request includes the device configuration information of client device A. The device emulation orchestration engine (462), in response to the device emulation container analysis, and using the device configuration information, identifies device A emulation container (470) that emulates device A in accordance with the device configuration information. Following the identification, the device emulation orchestration engine (462) sends upgrade request to a device A emulation agent (472) of the device A emulation container (470) [7].

Device A emulation agent (472), in response to the upgrade request, performs the method of FIG. 3C to perform the upgrade emulation on an emulated device A (474) [8]. The device A emulation agent (472) monitors the respective application upgrade emulation to generate live data associated with the application upgrade. However, the application upgrade experienced a failure because a required application version was not previously installed in the device. Following the completion of the application upgrade and the generation of live data associated with the application upgrade, device A emulation agent (472) provides the live data to the device emulation orchestration agent (462) [9].

FIG. 6C shows a diagram of the example system at a later point in time. For the sake of brevity, not all components of the example system may be illustrated in FIG. 6C. The application upgrade monitoring agent (434) sends a state prediction model training request to the state processor (464) based on a training schedule associated with the state prediction models [10]. The request also includes the training data to be used to generate the state prediction model.

In response to obtaining the state prediction model request, the state processor (464) trains a state prediction model using the training data [11]. To train the state prediction model, the state processor (464) performs a natural language processing to generate processed training data and then applies a neural network to a first portion of the processed training data to generate the state prediction model. After generating the state prediction model, the state processor (464) performs verification using the second portion of the processed training data and determines that the verification is successful [12].

At some later point in time, the application upgrade monitoring agent (434) obtains live data associated with the application upgrade performed in the device emulation system (460) as discussed in FIG. 6B. In response to obtaining the live data, the application upgrade monitoring agent sends a state prediction request to the state processor (464) [14]. The state prediction request may also include the live data associated with the application upgrade performed in the device emulation system (460). In response to obtaining the state prediction request, the state processor (464) generates a state prediction by performing natural language processing on the live data to obtain processed live data, and inputting the processed live data into the state prediction model [15]. The state processor (464) then determines that the state prediction indicates that the application upgrade was not successful [16]. In response to the determination, the state processor (464) then determines that the state prediction indicates that the application upgrade is fixable [17]. In response to the determination that the application upgrade is fixable, the state processor (464) initiates remediation of the application upgrade based on the state prediction by sending a request to remediate the application upgrade to the application upgrade monitoring agent (434) [18]. The application upgrade monitoring agent (434) then performs a remediation of the application upgrade.

End of Second Example

Figure 7A:
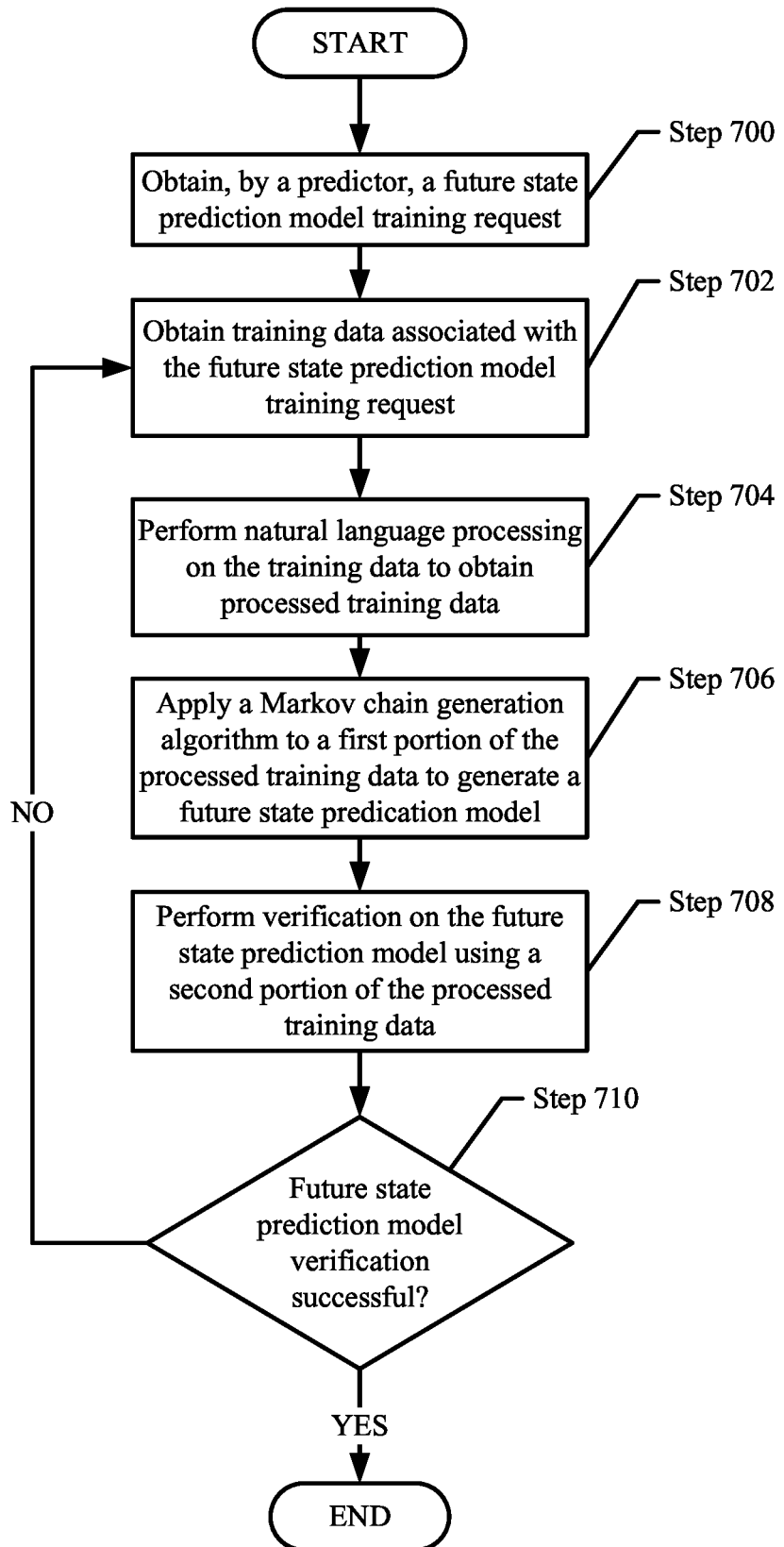
FIG. 7A shows a flowchart for training a future state prediction model in accordance with one or more embodiments of the invention.
Figure 7B:
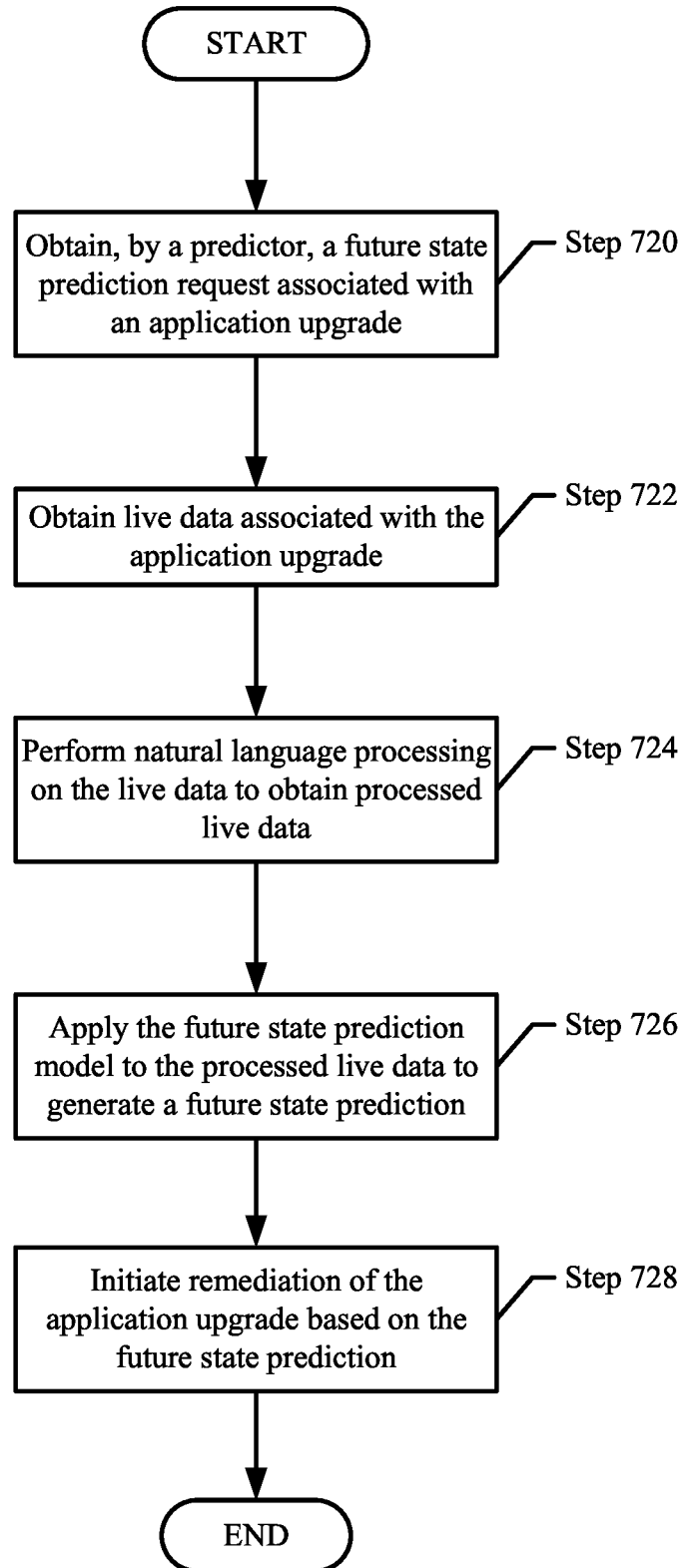
FIG. 7B shows a flowchart for generating a state prediction in accordance with one or more embodiments of the invention.

FIGS. 7A-7B show flowcharts in accordance with one or more embodiments of the invention. While the various steps in the flowcharts are presented and described sequentially, one of ordinary skill in the relevant art will appreciate that some or all of the steps may be executed in different orders, may be combined or omitted, and some or all steps may be executed in parallel. In one embodiment of the invention, the steps shown in FIGS. 7A-7B may be performed in parallel with any other steps shown in FIGS. 3A-3D, 5A-5B, 7A-7B, and/or 9A-9B without departing from the scope of the invention.

FIG. 7A shows a flowchart for training a future state prediction model in accordance with one or more embodiments of the invention. The method shown in FIG. 7A may be performed by, for example, a predictor (e.g., 170, FIG. 1). Other components of the system illustrated in FIG. 1 may perform the method of FIG. 7A without departing from the invention.

Turning to FIG. 7A, in step 700, a future state prediction model training request is obtained by the predictor. In one or more embodiments of the invention, the predictor obtains a message. The message may include a request to generate a future state prediction model. The message may be obtained from the application upgrade monitoring agent, a client device, a user (e.g., a system administrator), and/or other and/or additional components illustrated in the system of FIG. 1 without departing from the invention. The message may be provided to predictor based on a training schedule, as the predictor may generate and/or refine future state prediction models over time as new training data becomes available.

The training schedule may be one or more data structures that specify points in time and/or future state prediction model generation trigger events (e.g., future state prediction model verification failure, new training data available, application upgrade failure, etc.), the occurrence of which may trigger a request to generate a future state prediction model to be sent to the predictor. The training schedule may be maintained by the application upgrade monitoring agent and/or a user of the system. The application upgrade monitoring agent may monitor the training schedule and submit requests to generate future state prediction models based on the training schedule.

The message may be provided to the predictor using any appropriate method of data transmission without departing from the invention. As an example, the message may be transmitted as data packets through one or more network devices that operatively connect the predictor to the application upgrade monitoring agent and/or a user. The future state prediction model training request may be obtained by the predictor via other and/or additional methods without departing from the invention.

In step 702, training data associated with the future state prediction model training request is obtained. As discussed above, the predictor may obtain a message that includes the future state prediction model training request. The message may further include training data to be used to train and generate the future state prediction model. The predictor may obtain the training data associated with the future state prediction model training request by parsing the message and identifying the training data.

In other embodiments of the invention, the message obtained in step 700 may include training data identifiers (e.g., file identifiers, data chunk identifiers, etc.) and/or storage locations (e.g., pointers, storage addresses, etc.) associated with training data to be used to generate the future state prediction model. If the storage location is associated with a storage device that is not operatively connected to the predictor, then the message may further include communication information (e.g., network addresses, identifiers, encryption keys, etc.) that may be used to request and obtain the training data. The predictor may use the storage location and, if necessary, the identification information and the communication information to obtain the training data associated with the future state prediction model training request. The training data associated with the future state prediction model training request may be obtained via other and/or additional methods without departing from the invention.

The training data may be one or more data structures that include data that may be used to train and generate future state prediction models. The training data may include log information (e.g., log files) associated with application upgrades and the future states associated with the log information. The training data may include other and/or additional information associated with application upgrades (e.g., application upgrade identifies, application upgrade versions, application types, etc.) without departing from the invention. The application upgrade monitoring agent may maintain the training data. The training data may be updated by the application upgrade monitoring agent and/or a user (e.g., a system administrator) with log information and corresponding states over time.

In step 704, natural language processing is performed on the training data to obtain processed training data. As discussed above, the training data may include log information associated with previous application upgrades. The log information may include one or more sentences of human readable text descriptive of previous application upgrades. The predictor may perform natural language processing by performing tokenization on the log information included in the training data.

Tokenization, as used herein, may refer to separating the sentences of the log information included in the training data into each separate word of the sentence. The predictor may identify each word of each sentence included in the log information of the training data. Additionally, the predictor may assign a number to each word, with instances of the same word being assigned the same number. The predictor may maintain mappings between words and assigned numbers. The predictor may use the mappings to assign instances of words with the corresponding numbers. Each number representing a word in a sentence may be referred to as a token. And the collection of tokens associated with a particular sentence may be referred to as a sequence. The predictor may perform tokenization (i.e., generate sequences of tokens) using other and/or additional methods without departing from the invention.

In addition to performing tokenization, the predictor may also pad the sequences of tokens. In other words, the predictor may include one or more generic or null tokens (e.g., zero) in sequences of tokens in order to ensure that all sequences of tokens include the same length (i.e., each sequence includes the same number of tokens). As a result, the padded sequences of tokens may be in a form usable by a prediction algorithm to generate a future state prediction model. The padded sequences of tokens may be referred to as processed training data. Natural language processing may be performed on the training data to obtain processed training data via other and/or additional methods without departing from the invention.

In step 706, a Markov chain generation algorithm is applied to a first portion of the processed training data to generate a future state prediction model. In one or more embodiments of the invention, the predictor applies the Markov chain generation algorithm to a first portion of the processed training data to generate the future state prediction model. The predictor may split the processed training data into two portions, the first portion may input into the Markov chain generation algorithm to generate the future state prediction model. The future state prediction model may include a Markov chain. A Markov chain may include a future state prediction model that includes the probabilities of the future states based on the present state. In other words, for a particular state, the Markov chain may include the probability that each potential future state may be the next state. The predictor may perform other and/or additional future state prediction model training methods (e.g., optimization) without departing from the invention. The Markov chain generation algorithm is applied to a first portion of the processed training data to generate a future state prediction model via other and/or additional methods without departing from the invention.

In step 708, verification is performed on the future state prediction model using a second portion of the processed training data. In one or more embodiments of the invention, the predictor generates verification future state predictions by applying the future state prediction model to the second portion of the processed training data. The predictor may compare the verification future state predictions with the future states included in the second portion of the processed training data. When comparing the verification future state predictions with the future states included in the second portion of the processed training data, the predictor may calculate the error (e.g., the number of incorrect verification future state predictions with respect to total verification future state predictions) between the verification future state predictions and the future states included in the second portion of the processed data. Verification may be performed on the future state prediction model using the second portion of the processed data via other and/or additional methods without departing from the invention.

In step 710, a determination is made as to whether the future state prediction model verification is successful. As discussed above, the predictor may calculate the error when performing verification on the future state prediction model. The predictor may include or otherwise have access to an error threshold. The error threshold may be an error value over which the performance of the future state prediction model is inadequate and the future state prediction model verification is not successful. The predictor may compare the error with the error threshold. If the error exceeds the error threshold, the predictor may determine that the future state prediction model verification is not successful. If the error does not exceed the error threshold, then the predictor may determine that the state prediction model verification is successful. The determination as to whether the state prediction model verification is successful may be made via other and/or additional methods without departing from the invention.

In one or more embodiments of the invention, if it is determined that the future state prediction model verification is successful, then the method ends following step 710. In one or more embodiments of the invention, if it is determined that the future state prediction model verification is not successful, then the method proceeds to step 702. In such a scenario, additional training data may be obtained in step 702 and steps 704, 706, 708, and 710 may be repeated to increase the performance of the future state prediction model. Steps 702, 706, 708, and 710 may be repeated any number of times without departing from the invention.

FIG. 7B shows a flowchart for generating a future state prediction in accordance with one or more embodiments of the invention. The method shown in FIG. 7B may be performed by, for example, a predictor (e.g., 160, FIG. 1). Other components of the system illustrated in FIG. 1 may perform the method of FIG. 7B without departing from the invention.

Turning to FIG. 7B, in step 720, a future state prediction request associated with an application upgrade is obtained by the predictor. In one or more embodiments of the invention, the predictor obtains a message. The message may include a request to generate a future state prediction. The message may be obtained from the application upgrade monitoring agent. The message may be provided to the predictor after an application upgrade performed in the device emulation system experiences a failure.

The message may be provided to the predictor using any appropriate method of data transmission without departing from the invention. As an example, the message may be transmitted as data packets through one or more network devices that operatively connect the predictor to the application upgrade monitoring agent. The future state prediction request may be obtained by the predictor via other and/or additional methods without departing from the invention.

In step 722, live data associated with the application upgrade is obtained. As discussed above, the predictor may obtain a message that includes the future state prediction request. The message may further include live data associated with the application upgrade for which the future state prediction is to be generated. The predictor may obtain the live data associated with the future state prediction request by parsing the message and identifying the training data.

In other embodiments of the invention, the message obtained in step 720 may include live data identifiers (e.g., file identifiers, data chunk identifiers, etc.) and/or storage locations (e.g., pointers, storage addresses, etc.) associated with the live data to be used to generate the future state prediction. If the storage location is associated with a storage device that is not operatively connected to the predictor, then the message may further include communication information (e.g., network addresses, identifiers, encryption keys, etc.) that may be used to request and obtain the live data. The predictor may use the storage location and, if necessary, the identification information and the communication information to obtain the live data associated with the future state prediction request. The live data associated with the future state prediction request may be obtained via other and/or additional methods without departing from the invention.

The live data may be one or more data structures that include data that may be used to generate future state predictions. The live data may include log information (e.g., log files) associated with the application upgrade for which the future state prediction is to be generated. The live data may include other and/or additional information associated with application upgrade (e.g., application upgrade identifier, application upgrade version, application types etc.) without departing from the invention. The device emulation agent associated with the application may generate the live data during the performance of the application upgrade on the emulated device.

In step 724, natural language processing is performed on the live data to obtain processed live data. As discussed above, the live data may include log information associated with the application upgrade for which the future state prediction is to be generated. The log information may include one or more sentences of human readable text descriptive of the application upgrade. The predictor may perform natural language processing by performing tokenization on the log information included in the live data.

Tokenization, as used herein, may refer to separating the sentences of the log information included in the live data into each separate word of the sentence. The predictor may identify each word of each sentence included in the log information of the live data. Additionally, the predictor may assign a number to each word, with instances of the same word being assigned the same number. The predictor may maintain mappings between words and assigned numbers. The predictor may use the mappings to assign instances of words with the corresponding numbers. Each number representing a word in a sentence may be referred to as a token. And the collection of tokens associated with a particular sentence may be referred to as a sequence. The predictor may perform tokenization (i.e., generate sequences of tokens) using other and/or additional methods without departing from the invention.

In addition to performing tokenization, the predictor may also pad the sequences of tokens. In other words, the predictor may include one or more generic or null tokens (e.g., zero) in sequences of tokens in order to ensure that all sequences of tokens include the same length (i.e., each sequence includes the same number of tokens). As a result, the padded sequences of tokens may be in a form usable by a prediction algorithm to generate a future state prediction. The padded sequences of tokens may be referred to as processed live data. Natural language processing may be performed on the live data to obtain processed live data via other and/or additional methods without departing from the invention.

In step 726, the future state prediction model is applied to the processed live data to generate a future state prediction. The predictor may input the processed live data into the future state prediction model to generate a future state prediction. As discussed above, the future state prediction model may include a Markov chain. The processed live data may be used to identify the current state of the application upgrade. Once the current state is identified, the Markov chain may include probabilities associated with potential future states that may be the next state of the application upgrade. The predictor may identify the potential future state associated with the current state that includes the highest probability as the future state prediction. The future state prediction may include a state identifier that may be used to specify the predicted future state. The future state prediction model may be applied to the processed live data to generate the future state prediction via other and/or additional methods without departing from the invention.

In step 728, remediation of the application upgrade is initiated based on the future state prediction. In one or more embodiments of the invention, the predictor sends a message to the application upgrade monitoring agent. The message may include the future state prediction and a request to remediate the application upgrade based on the future state prediction. The message may include other and/or additional information without departing from the invention.

The message may be sent to the application upgrade monitoring agent using any appropriate method of data transmission without departing from the invention. As an example, the message may be transmitted as data packets through one or more network devices that operatively connect the predictor to the application upgrade monitoring agent. In response to obtaining the message, the application upgrade monitoring agent may initiate the remediation of the application upgrade based on the future state prediction. For additional information regarding remediation of application upgrades, refer to FIGS. 9A-9B. Remediation of the application upgrade may be initiated via other and/or additional methods without departing from the invention.

In one or more embodiments of the invention, the method ends following step 728.

Third Example

Figure 8A:
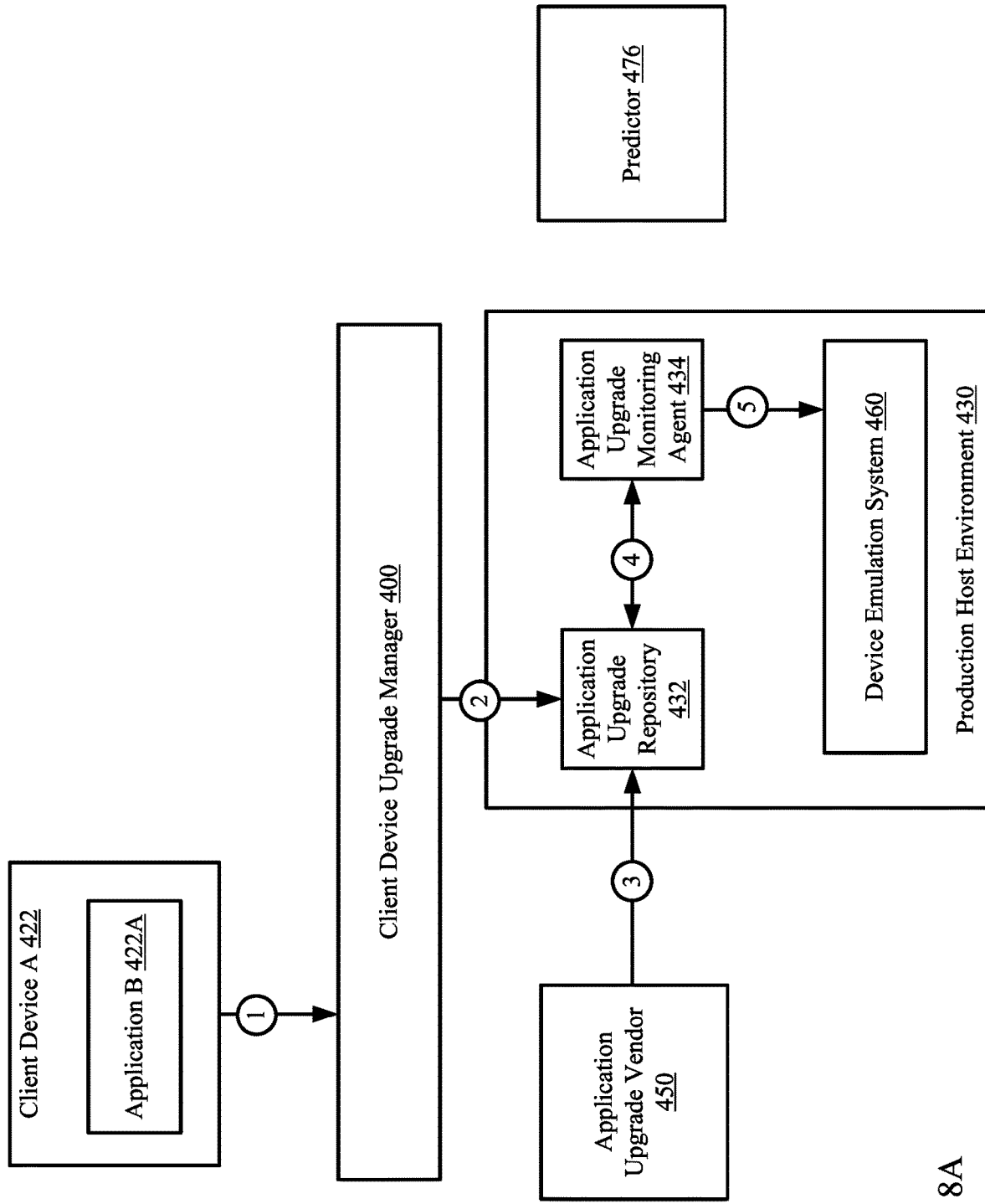
FIGS. 8A-8C show a third example in accordance with one or more embodiments of the invention.
Figure 8B:
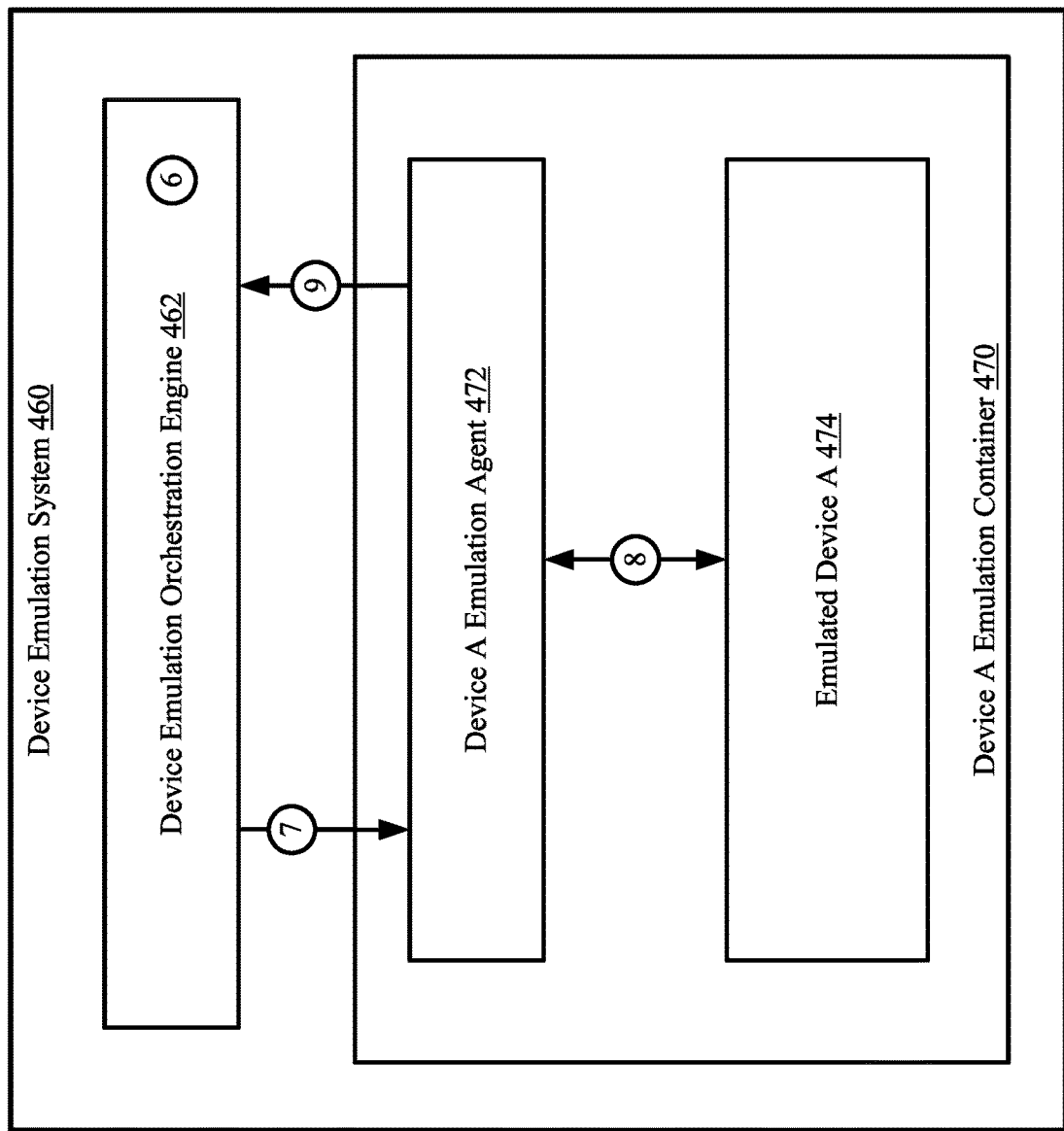
Figure 8C:
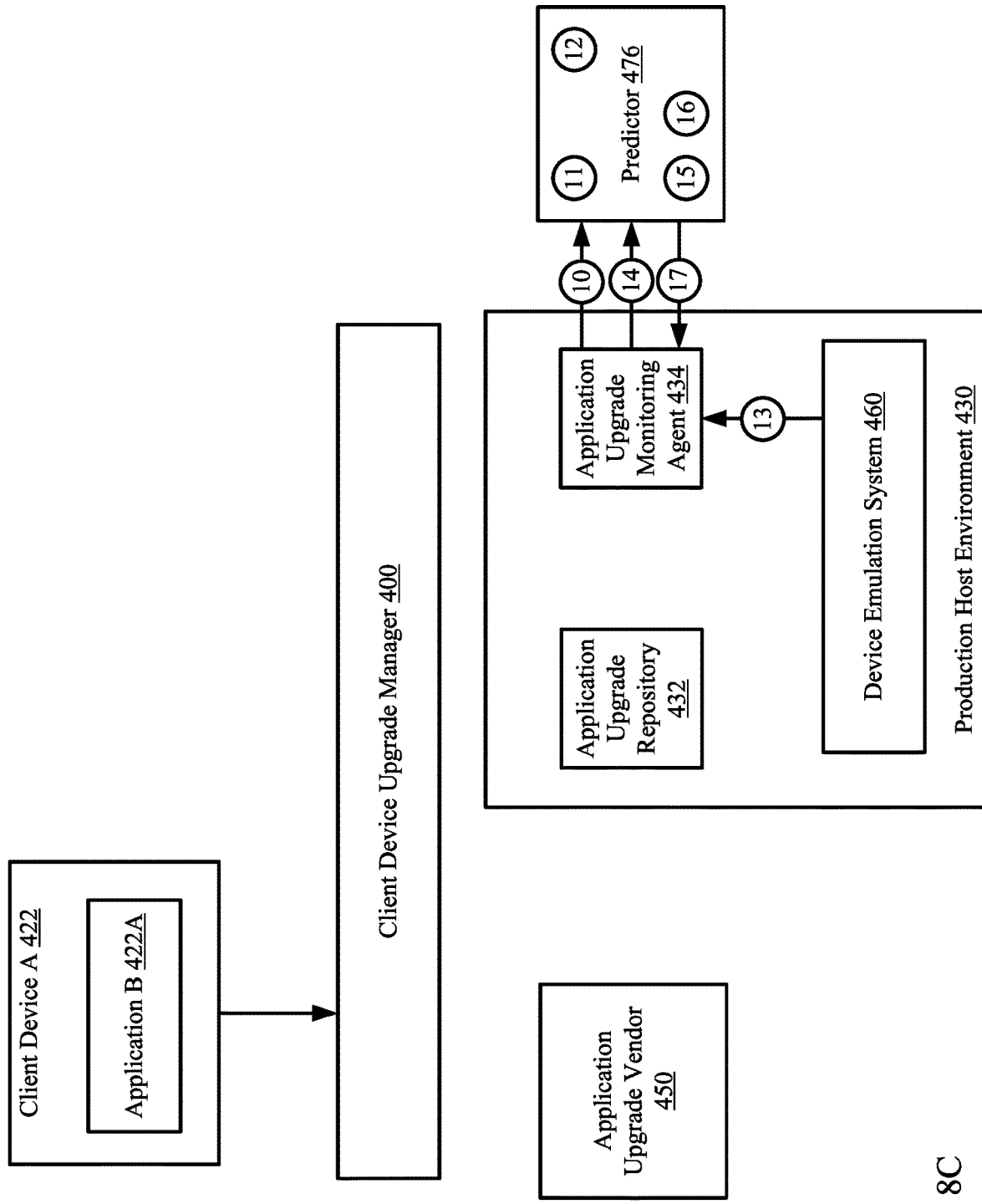

The following section describes a third example. The third example, illustrated in FIGS. 8A-8C, is not intended to limit the invention and is independent from any other examples discussed in this application. Turning to the third example, consider a scenario in which a future state prediction is generated for application upgrade associated with an application executing on a client device.

Turning to the example, FIG. 8A shows a diagram of an example system. For the sake of brevity, not all components of the example system may be illustrated in FIG. 8A. The example system may include client device A (422). Client device A (422) executes application B (422A).

A client device upgrade manager (400) obtains device configuration information from client device A (422) [1]. The client device upgrade manager (400) stores configuration files corresponding to the device configuration information of client device A (422) in an application upgrade repository (432) of a production host environment (430) [2].

At a later time, an application upgrade vendor (450) stores a new application upgrade in the application upgrade repository (432) [3]. The new application upgrade relates to the application (422A) executing on client device A (422). An application upgrade monitoring agent (434) monitoring the application upgrade repository (432) identifies the new application upgrade [4]. The application upgrade monitoring agent (434), in response to identifying the new application upgrade, sends an upgrade request to a device emulation system (460) [5]. The upgrade request includes the device configuration information of client device A (422).

FIG. 8B shows a diagram of the device emulation system at a later point in time. For the sake of brevity, not all components of the example system may be illustrated in FIG. 8B. A device emulation orchestration engine (462) of the device emulation system (460) obtains the upgrade request and performs a device emulation container analysis as discussed in FIG. 3B to identify device emulation containers to perform the upgrade emulations [6]. The upgrade request includes the device configuration information of client device A. The device emulation orchestration engine (462), in response to the device emulation container analysis, and using the device configuration information, identifies device A emulation container (470) that emulates device A in accordance with the device configuration information. Following the identification, the device emulation orchestration engine (462) sends upgrade request to a device A emulation agent (472) of the device A emulation container (470) [7].

Device A emulation agent (472), in response to the upgrade request, performs the method of FIG. 3C to perform the upgrade emulation on an emulated device A (474) [8]. The device A emulation agent (472) monitors the respective application upgrade emulation to generate live data associated with the application upgrade. However, the application upgrade experienced a failure because a required application version was not previously installed in the device. Following the completion of the application upgrade and the generation of live data associated with the application upgrade, device A emulation agent (472) provides the live data to the device emulation orchestration agent (462) [9].

FIG. 8C shows a diagram of the example system at a later point in time. For the sake of brevity, not all components of the example system may be illustrated in FIG. 8C. The application upgrade monitoring agent (464) sends a future state prediction model training request to the predictor (476) based on a training schedule associated with the future state prediction models [10]. The request also includes the training data to be used to generate the future state prediction model.

In response to obtaining the future state prediction model request, the predictor (476) trains a future state prediction model using the training data [11]. To train the future state prediction model, the predictor (476) performs a natural language processing to generate processed training data and then applies a Markov chain generation algorithm to a first portion of the processed training data to generate the future state prediction model. After generating the future state prediction model, the predictor (476) performs verification using the second portion of the processed training data and determines that the verification is successful [12].

At some later point in time, the application upgrade monitoring agent (434) obtains live data associated with the application upgrade performed in the device emulation system (460) as discussed in FIG. 6B. In response to obtaining the live data, the application upgrade monitoring agent (434) sends a future state prediction request to the predictor (476) [14]. The future state prediction request may also include the live data associated with the application upgrade performed in the device emulation system (460). In response to obtaining the future state prediction request, the predictor (476) generates a future state prediction by performing natural language processing on the live data to obtain processed live data [15]. After generating the processed live data, the predictor (476) inputs the processed live data into the future state prediction model to generate the future state prediction [16]. After generating the future state prediction, the predictor (476) initiates remediation of the application upgrade based on the future state prediction by sending a request to remediate the application upgrade to the application upgrade monitoring agent (434) [17]. The application upgrade monitoring agent (434) then performs a remediation of the application upgrade.

End of Third Example

Figure 9A:
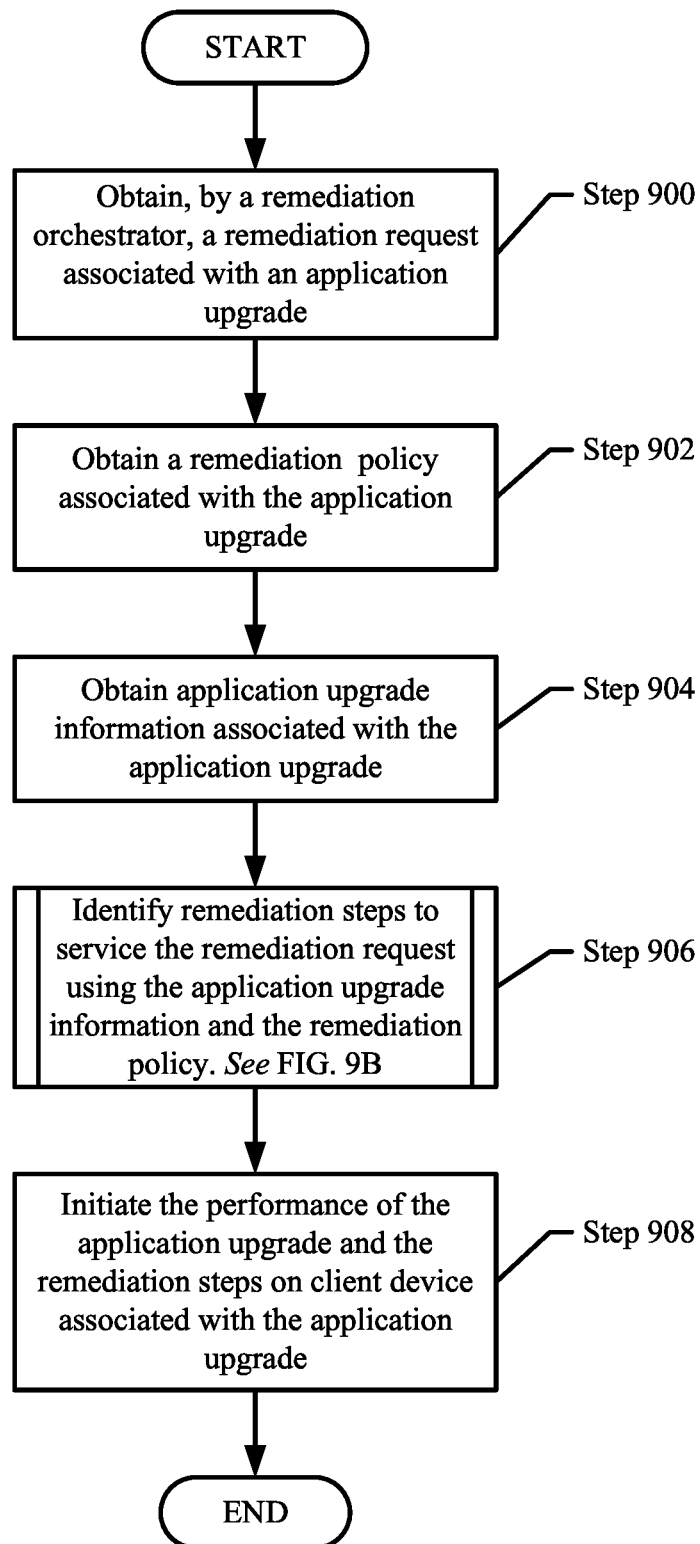
FIG. 9A shows a flowchart for remediating an application upgrade failure in accordance with one or more embodiments of the invention.
Figure 9B:
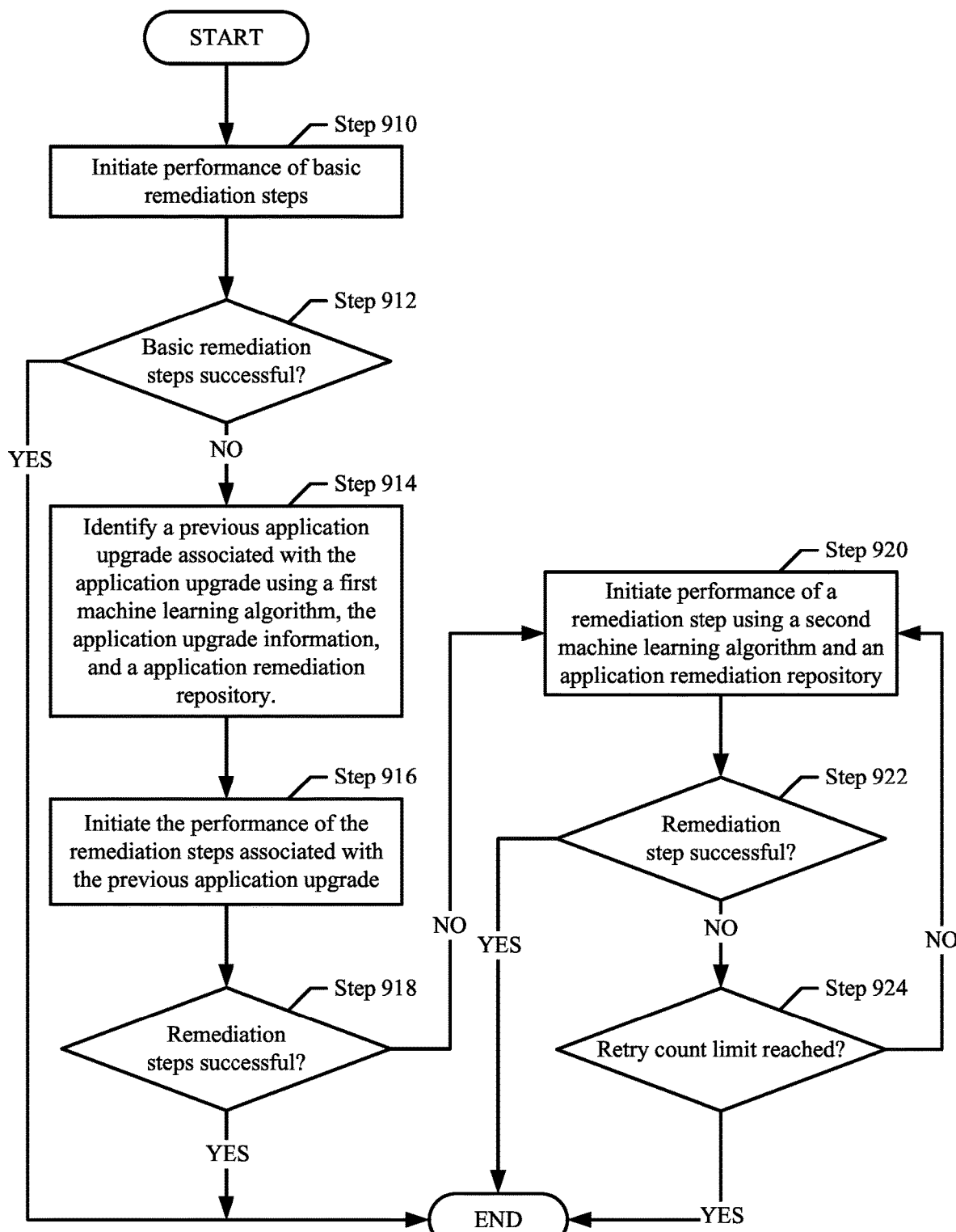
FIG. 9B shows a flowchart for identifying remediation steps to service a remediation request in accordance with one or more embodiments of the invention.

FIGS. 9A-9B show flowcharts in accordance with one or more embodiments of the invention. While the various steps in the flowcharts are presented and described sequentially, one of ordinary skill in the relevant art will appreciate that some or all of the steps may be executed in different orders, may be combined or omitted, and some or all steps may be executed in parallel. In one embodiment of the invention, the steps shown in FIGS. 9A-9B may be performed in parallel with any other steps shown in FIGS. 3A-3D, 5A-5B, 7A-7B, and/or 9A-9B without departing from the scope of the invention.

FIG. 9A shows a flowchart for remediating an application upgrade failure in accordance with one or more embodiments of the invention. The method shown in FIG. 9A may be performed by, for example, a remediation orchestrator (e.g., 180, FIG. 1). Other components of the system illustrated in FIG. 1 may perform the method of FIG. 9A without departing from the invention.

Turning to FIG. 9A, in step 900, a remediation request associated with an application upgrade is obtained by the remediation orchestrator. In one or more embodiments of the invention, the remediation orchestrator obtains a message from the application upgrade monitoring agent. The message may include a request to remediate the application upgrade. The message may also include a state prediction and/or a future state prediction associated with the application upgrade. The message may include other and/or additional information without departing from the invention.

The message may be obtained by the remediation orchestration from the application upgrade monitoring agent using any appropriate method of data transmission without departing from the invention. As an example, the message may be transmitted as data packets through one or more network devices that operatively connect the remediation orchestrator to the application upgrade monitoring agent. A remediation request associated with an application upgrade may be obtained by the remediation orchestrator via other and/or additional methods without departing from the invention.

In step 902, a remediation policy associated with the application upgrade is obtained. The message obtained in step 900 may also include an application identifier and an application type associated with the application for which the application upgrade is performed. As discussed above, the remediation orchestrator may include a remediation policy repository.

The remediation policy repository may be one or more data structures that include remediation policies associated with applications and/or application types. The remediation policy repository may include other and/or additional information without departing from the invention. The remediation policy repository may be updated by users to modify, add, and/or remove remediation policies. The remediation policies may specify a priority and a retry count limit associated with the corresponding application. The priority may be associated with the retry count limit Higher priority applications may be associated with higher retry count limits. The remediation policies may include other and/or additional information associated with the remediation of applications without departing from the invention.

The remediation orchestrator may use the application identifier and/or the application type to identify a remediation policy of the remediation policy repository that includes a matching application identifier and/or a matching application type. The identified remediation policy may be associated with the application upgrade. The remediation orchestrator may obtain the identified remediation policy from the remediation policy repository. The remediation policy associated with the application upgrade may be obtained via other and/or additional methods without departing from the invention.

In step 904, application upgrade information associated with the application upgrade is obtained. In one or more embodiments of the invention, the message obtained in step 900 may further include the application upgrade information. The remediation orchestrator may obtain the application upgrade information by parsing the message and identifying the application upgrade information.

In other embodiments of the invention, the remediation orchestrator sends a message to the application upgrade monitoring agent. The message may include a request for the application upgrade information. In response to obtaining the request for application upgrade information, the application upgrade monitoring agent may fetch and send the application upgrade information associated with the application upgrade to the remediation orchestrator. The request and the corresponding application upgrade information may be transmitted between the remediation orchestrator and the application upgrade monitoring agent using any appropriate method of data transmission without departing from the invention. As an example, the request and corresponding application upgrade information may be transmitted as data packets through one or more network devices that operatively connect the remediation orchestrator to the application upgrade monitoring agent. The application upgrade information associated with the application upgrade may be obtained via other and/or additional methods without departing from the invention.

The application upgrade information may be one or more data structures that include data that may be used identify steps to remediate application upgrades that have failed. The application upgrade information may include log information (e.g., log files) associated with the application upgrade for which the future state prediction is to be generated. The application upgrade information may include other and/or additional information associated with application upgrade (e.g., application upgrade identifier, application upgrade version, application types etc.) without departing from the invention. The device emulation agent associated with the application may generate the application upgrade information during the performance of the application upgrade on the emulated device.

In step 906, remediation steps to service the remediation request are identified using the application upgrade information and the remediation policy. In one or more embodiments of the invention, the remediation orchestrator uses three methods to attempt to remediate the application upgrade using the application upgrade information and the remediation policy. The three methods may include: (i) performing basic remediation steps to remediate the application upgrade, (ii) identifying a similar previous application upgrade failure and remediation steps associated with the previous application upgrade failure using a first machine learning model, and (iii) manually identifying remediation steps using a second machine learning model. For additional information regarding identifying remediation steps to service the remediation request, refer to FIG. 9B. The remediation steps to service the remediation request may be identified via other and/or additional methods without departing from the invention.

In step 908, the performance of the application upgrade and the remediation steps associated with the application upgrade is initiated on the client device. In one or more embodiments of the invention, the remediation orchestrator may send a message to the application upgrade monitoring agent. The message may include the identified remediation steps to remediate the application upgrade and a request to perform the application upgrade and the remediation steps on a client device associated with the application upgrade. In response to obtaining the message, the application upgrade monitoring agent may provide the application upgrade and the remediation steps to the client device upgrade manager.

The client device upgrade manager may perform the application upgrade on the client device and automatically perform the remediation steps to remediate the application upgrade.

In one or more embodiments of the invention, the method ends following step 908.

FIG. 9B shows a flowchart for identifying remediation steps to service a remediation request in accordance with one or more embodiments of the invention. The method shown in FIG. 9B may be performed by, for example, a remediation orchestrator (e.g., 180, FIG. 1). Other components of the system illustrated in FIG. 1 may perform the method of FIG. 9B without departing from the invention.

Turning to FIG. 9B, in step 910, the performance of basic remediation steps is initiated. In one or more embodiments of the invention, the remediation orchestrator sends a message to the application upgrade monitoring agent. The message may include one or more basic remediation steps and a request to perform the basic remediation steps to attempt to remediate the application upgrade. The application upgrade monitoring agent may then provide the message to the device emulation orchestration engine of the device emulation system. In response to obtaining the message, the device emulation orchestration engine may then perform the basic remediation steps to remediate the application upgrade on the device emulation in the device emulation container. The basic remediation steps may include, for example, retrying the application upgrade, restarting the device emulation, etc. The basic remediation steps may include other and/or additional basic and/or quick actions that may be performed that may remediate the application upgrade.

During and/or after the performance of the basic remediation steps, the device emulation orchestration engine may generate and/or obtain additional remediation information (e.g., new log information) associated with the performance of the basic remediation steps from the device emulation agent. The remediation information may indicate whether the performance of the basic remediation steps were successful. The device emulation orchestration engine may provide the remediation information to the application upgrade monitoring agent. The application upgrade monitoring agent may, using the remediation information, send a notification to the remediation orchestrator that indicates whether the performance of the basic remediation steps were successful in remediating the application upgrade. The notification may include, for example, a successful flag, which when set indicates that the basic remediation steps were successful and when not set indicates that the basic remediation steps were not successful. The notification may include other and/or additional information without departing from the invention.

The performance of basic remediation steps may be initiated via other and/or additional methods without departing from the invention.

In step 912, a determination is made as to whether the basic remediation steps were successful. As discussed above, the remediation orchestrator may obtain a notification from the application upgrade monitoring agent. The notification may include a successful flag which may indicate whether the performance of the basic remediation steps were successful in remediating the application upgrade. In one or more embodiments of the invention, to determine whether the basic remediation steps were successful, the remediation orchestrator may check the successful flag included in the notification. In one or more embodiments of the invention, if the successful flag is set, then the remediation orchestrator determines that the basic remediation steps were successful in remediating the application upgrade. In one or more embodiments of the invention, if the successful flag is not set, then the remediation orchestrator determines that the basic remediation steps were not successful in remediating the application upgrade. The determination as to whether the basic remediation steps were successful may be made via other and/or additional methods without departing from the invention.

In one or more embodiments of the invention, if it is determined that the basic steps were successful, then the method ends following step 912. In one or more embodiments of the invention, if it is determined that the basic steps were not successful, then the method proceeds to step 914.

In step 914, a previous application upgrade associated with the application upgrade is identified using a first machine learning algorithm, the application upgrade information, and the application remediation repository. In one or more embodiments of the invention, the remediation orchestrator applies the first machine learning algorithm to the application upgrade information and the application remediation repository previous application upgrade failures that were remediated that are similar to the current application upgrade that the remediation orchestrator is attempting to remediate. The first machine learning algorithm may be a K-Nearest Neighbors (KNN) algorithm. The KNN algorithm may divide the previous application upgrade failures into groups (i.e., neighbors) of similar application upgrade failures. The algorithm may use these groups to identify similar previous application upgrade failures associated with the target application upgrade. The KNN algorithm may provide the application upgrade identifier of the previous application upgrade that is the most similar to the target application upgrade. The previous application upgrade associated with the application upgrade may be identified using a first machine learning algorithm, the application upgrade information, and the application remediation repository via other and/or additional methods without departing from the invention.

The application remediation repository may be one or more data structures that may be used to identify remediation steps to remediate application upgrades that have failed. The application repository may include application remediation repository entries. Each application remediation entry may be associated with a previous application upgrade that has failed. The application remediation repository entry may include information associated with the corresponding application upgrade. The information may include, an application upgrade identifier, remediation steps used to remediate the application upgrade, log information, application upgrade identifier, application upgrade version, application type, and other and/or additional types of information without departing from the invention. The application repository may also include a list of possible remediation steps that may be used to remediate application upgrade. Each remediation step included in the list may be associated with a reward count. The application remediation repository may be maintained by the application upgrade monitoring agent, the remediation orchestrator, and/or a user of the system.

In step 916, the performance of remediation steps associated with the previous application upgrade are initiated. The remediation orchestrator may identify an application remediation repository entry that includes the application upgrade identifier associated with the previous application upgrade identified in step 914. The remediation orchestrator may then identify the remediation steps included in the application remediation repository that were performed to remediate the corresponding previous application upgrade.

In one or more embodiments of the invention, the remediation orchestrator sends a message to the application upgrade monitoring agent. The message may include the identified remediation steps and a request to perform the remediation steps to attempt to remediate the application upgrade. The application upgrade monitoring agent may then provide the message to the device emulation orchestration engine of the device emulation system. In response to obtaining the message, the device emulation orchestration engine may then perform the remediation steps to remediate the application upgrade on the device emulation in the device emulation container. The remediation steps may include, for example, generating another device emulation container, modifying the device emulation container, etc. The remediation steps may include other and/or additional actions that may be performed that may remediate the application upgrade.

During and/or after the performance of the remediation steps, the device emulation orchestration engine may generate and/or obtain additional remediation information (e.g., new log information) associated with the performance of the remediation steps from the device emulation agent. The remediation information may indicate whether the performance of the remediation steps were successful. The device emulation orchestration engine may provide the remediation information to the application upgrade monitoring agent. The application upgrade monitoring agent may, using the remediation information, send a notification to the remediation orchestrator that indicates whether the performance of the remediation steps were successful in remediating the application upgrade. The notification may include, for example, a successful flag, which when set indicates that the remediation steps were successful and, when not set, indicates that the remediation steps were not successful. The notification may include other and/or additional information without departing from the invention.

The performance of remediation steps may be initiated via other and/or additional methods without departing from the invention.

In step 918, a determination is made as to whether the remediation steps were successful. As discussed above, the remediation orchestrator may obtain a notification from the application upgrade monitoring agent. The notification may include a successful flag which may indicate whether the performance of the remediation steps were successful in remediating the application upgrade. In one or more embodiments of the invention, to determine whether the remediation steps were successful, the remediation orchestrator may check the successful flag included in the notification. In one or more embodiments of the invention, if the successful flag is set, then the remediation orchestrator determines that the remediation steps were successful in remediating the application upgrade. In one or more embodiments of the invention, if the successful flag is not set, then the remediation orchestrator determines that the remediation steps were not successful in remediating the application upgrade. The determination as to whether the remediation steps were successful may be made via other and/or additional methods without departing from the invention.

In one or more embodiments of the invention, if it is determined that the remediation steps were successful, then the method ends following step 918. In one or more embodiments of the invention, if it is determined that the remediation steps were not successful, then the method proceeds to step 920.

In one or more embodiments of the invention, in step 920, performance of a remediation step is initiated using a second machine learning algorithm and an application remediation repository. In one or more embodiments of the invention, the remediation orchestrator uses the second machine learning algorithm to identify a remediation step to remediate the application upgrade. The second machine learning algorithm may be a reinforcement learning algorithm. As discussed above, the application remediation repository may include a list of all possible remediation steps that may be taken to attempt to remediate the application upgrade. Each remediation step may include a reward count. The remediation orchestrator may select the remediation step associated with the highest reward count (i.e., the remediation step that has been most successful remediating previous application upgrade) as the remediation step to perform. In scenarios in which multiple remediation steps are associated with the highest reward count, the remediation orchestrator may select the randomly select one of the remediation steps. For a particular application upgrade, the remediation orchestrator may track which remediation steps have been performed as to avoid repeating unsuccessful remediation steps.

In one or more embodiments of the invention, the remediation orchestrator sends a message to the application upgrade monitoring agent. The message may include the identified remediation step and a request to perform the remediation step to attempt to remediate the application upgrade. The application upgrade monitoring agent may then provide the message to the device emulation orchestration engine of the device emulation system. In response to obtaining the message, the device emulation orchestration engine may then perform the remediation step to remediate the application upgrade on the device emulation in the device emulation container. The remediation step may include, for example, generating another device emulation container, modifying the device emulation container, etc. The remediation step may include other and/or additional actions that may be performed that may remediate the application upgrade.

During and/or after the performance of the remediation step, the device emulation orchestration engine may generate and/or obtain additional remediation information (e.g., new log information) associated with the performance of the remediation step from the device emulation agent. The remediation information may indicate whether the performance of the remediation step was successful. The device emulation orchestration engine may provide the remediation information to the application upgrade monitoring agent. The application upgrade monitoring agent may, using the remediation information, send a notification to the remediation orchestrator that indicates whether the performance of the remediation step was successful in remediating the application upgrade. The notification may include, for example, a successful flag, which when set indicates that the remediation step was successful and, when not set, indicates that the remediation step was not successful. The notification may include other and/or additional information without departing from the invention.

In step 922, a determination is made as to whether the remediation step was successful. As discussed above, the remediation orchestrator may obtain a notification from the application upgrade monitoring agent. The notification may include a successful flag, which may indicate whether the performance of the remediation step was successful in remediating the application upgrade. In one or more embodiments of the invention, to determine whether the remediation step was successful, the remediation orchestrator may check the successful flag included in the notification. In one or more embodiments of the invention, if the successful flag is set, then the remediation orchestrator determines that the remediation step was successful in remediating the application upgrade. In one or more embodiments of the invention, if the successful flag is not set, then the remediation orchestrator determines that the remediation step was not successful in remediating the application upgrade. The determination as to whether the remediation step was successful may be made via other and/or additional methods without departing from the invention.

In one or more embodiments of the invention, if it is determined that the remediation step was successful, then the method ends following step 922. In such a scenario, the remediation orchestrator may also increment the reward count associated with the remediation step for future application upgrade remediation. In one or more embodiments of the invention, if it is determined that the remediation step was not successful, then the method proceeds to step 924. In such a scenario, the remediation orchestrator may also decrement the reward count associated with the remediation step for future application upgrade remediation.

In step 924, a determination is made as to whether a retry count limit is reached. As discussed above, the remediation policy associated with the application upgrade may include a retry count. The remediation orchestrator may track the number of attempts (i.e., the retry count) that have been made to remediate the application upgrade. The remediation orchestrator may compare the current retry count with the retry count limit to determine whether the retry count limit is reached. In one or more embodiments of the invention, if the current retry count equals the retry count limit, then the remediation orchestrator determines that the retry count limit is reached. In one or more embodiments of the invention, if the current retry count does not equal (i.e., is less than) the retry count limit, then the remediation orchestrator determines that the retry count limit is not yet reached.

In one or more embodiments of the invention, if it is determined that the retry count limit is reached, then the method ends following step 924. In one or more embodiments of the invention, if it is determined that the retry count limit is not reached, then the method proceeds to step 920 to identify another remediation step using the reinforcement learning algorithm. The remediation orchestrator may repeat step 920, step 922, and step 924 until a remediation step is successful or the retry count limit is reached.

If the retry count limit is reached, then the remediation orchestrator may notify the application upgrade monitoring agent that the remediation of the application upgrade has failed. In response to obtaining the notification, the application upgrade monitoring agent may notify the client device upgrade manager and/or a user of the system (e.g., a system administrator) that the application upgrade and the remediation of the application upgrade failed.

It may be determined whether the retry count limit is reached via other and/or additional methods without departing from the invention.

Fourth Example

Figure 10A:
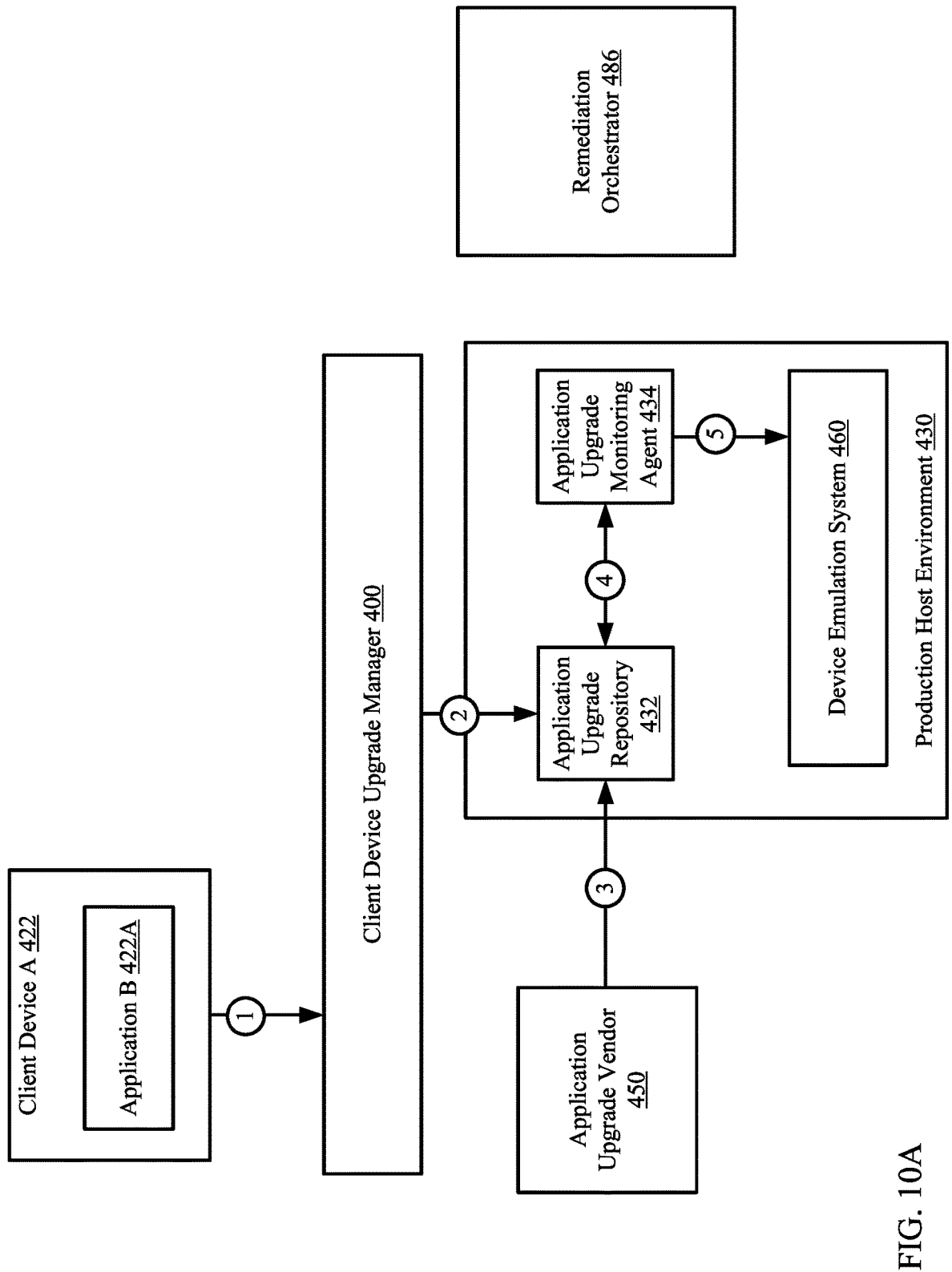
FIGS. 10A-10C show a fourth example in accordance with one or more embodiments of the invention.
Figure 10B:
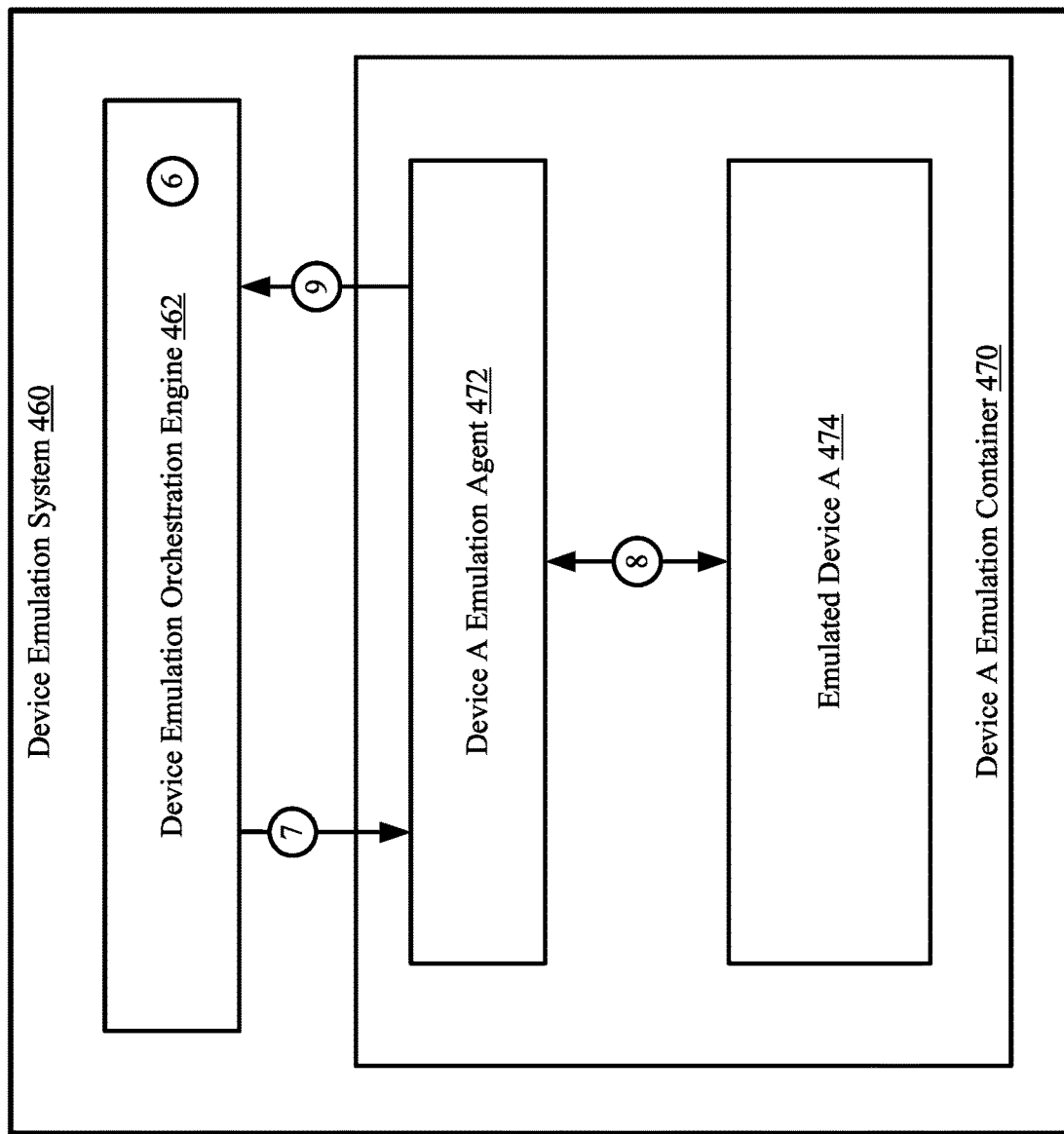
Figure 10C:
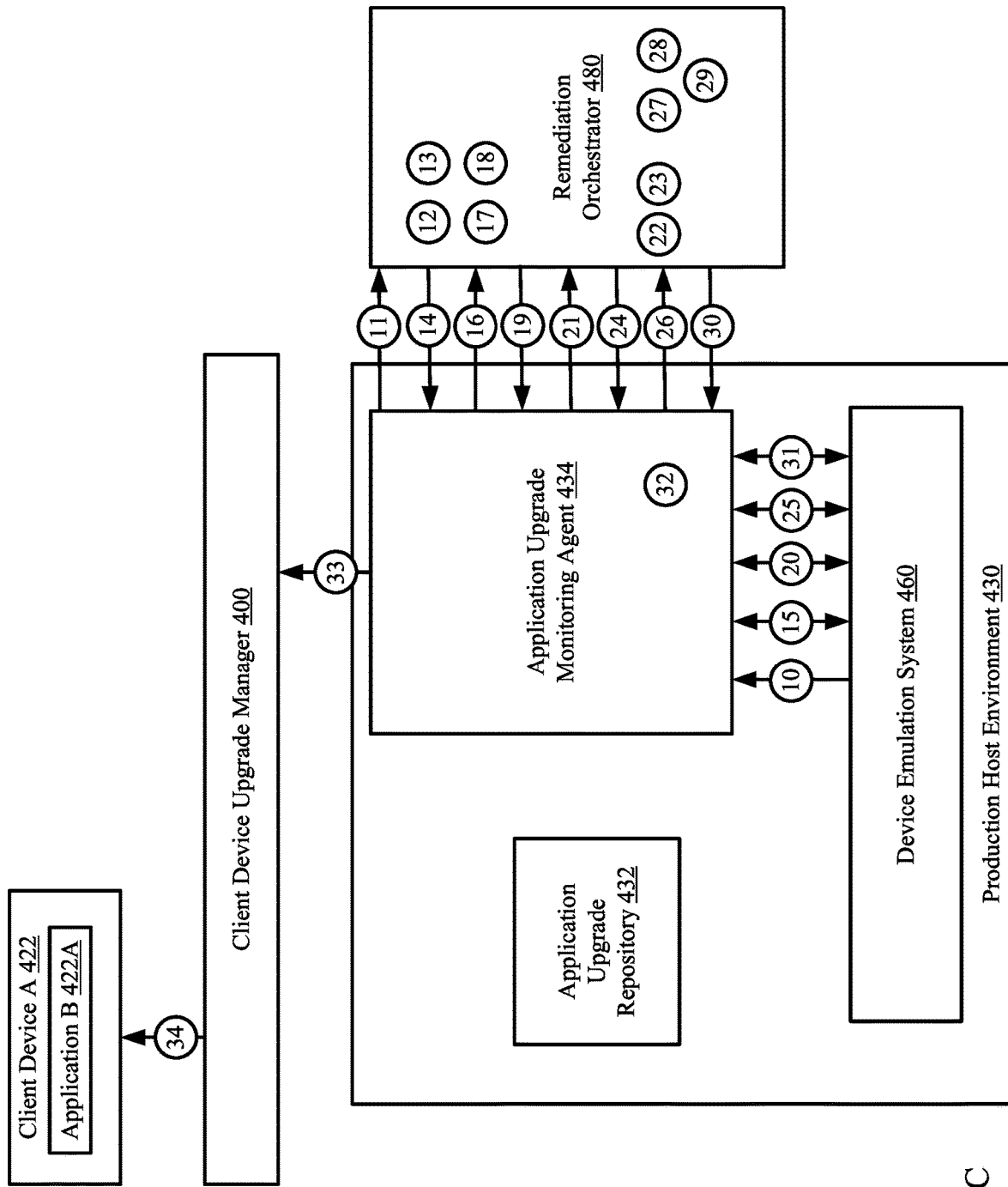

The following section describes a fourth example. The fourth example, illustrated in FIGS. 10A-10C, is not intended to limit the invention and is independent from any other examples discussed in this application. Turning to the fourth example, consider a scenario in which an application upgrade failure is remediated by a remediation orchestrator.

Turning to the fourth example, FIG. 10A shows a diagram of an example system. For the sake of brevity, not all components of the example system may be illustrated in FIG. 10A. The example system may include client device A (422). Client device A (422) executes application B (422A).

A client device upgrade manager (400) obtains device configuration information from client device A (422) [1]. The client device upgrade manager (400) stores configuration files corresponding to the device configuration information of client device A (422) in an application upgrade repository (432) of a production host environment (430) [2].

At a later time, an application upgrade vendor (450) stores a new application upgrade in the application upgrade repository (432) [3]. The new application upgrade relates to the application (422A) executing on client device A (422). An application upgrade monitoring agent (434) monitoring the application upgrade repository (432) identifies the new application upgrade [4]. The application upgrade monitoring agent (434), in response to identifying the new application upgrade, sends an upgrade request to a device emulation system (460) [5]. The upgrade request includes the device configuration information of client device A (422).

FIG. 10B shows a diagram of the device emulation system at a later point in time. For the sake of brevity, not all components of the example system may be illustrated in FIG. 10B. A device emulation orchestration engine (462) of the device emulation system (460) obtains the upgrade request and performs a device emulation container analysis as discussed in FIG. 3B to identify device emulation containers to perform the upgrade emulations [6]. The upgrade request includes the device configuration information of client device A. The device emulation orchestration engine (462), in response to the device emulation container analysis, and using the device configuration information, identifies device A emulation container (470) that emulates device A in accordance with the device configuration information. Following the identification, the device emulation orchestration engine (462) sends upgrade request to a device A emulation agent (472) of the device A emulation container (470) [7].

Device A emulation agent (472), in response to the upgrade request, performs the method of FIG. 3C to perform the upgrade emulation on an emulated device A (474) [8]. The device A emulation agent (472) monitors the respective application upgrade emulation to generate application upgrade information associated with the application upgrade. However, the application upgrade experienced a failure because a required application version was not previously installed in the device. Following the completion of the application upgrade and the generation of application upgrade information associated with the application upgrade, device A emulation agent (472) provides the application upgrade information to the device emulation orchestration agent (462) [9].

FIG. 10C shows a diagram of the example system at a later point in time. For the sake of brevity, not all components of the example system may be illustrated in FIG. 10C. The application upgrade monitoring agent (434) obtains the application upgrade information from the device emulation system (460) [10]. The application upgrade monitoring agent (434) then sends a remediation request to the remediation orchestrator (486) [11]. The request also includes the application upgrade information. The remediation orchestrator (486) then obtains a remediation policy that includes a retry count limit associated with the application upgrade [12]. The remediation orchestrator (486) then obtains the application upgrade information from the remediation request [13]. The remediation orchestrator (486) sends a request to the application upgrade monitoring agent (434) initiating the performance of basic remediation steps to remediate the application upgrade [14].

In response to the request to perform the basic remediation steps, the application upgrade monitoring agent (434) instructs the device emulation orchestration engine to perform the basic remediation steps. The device emulation orchestration engine performs the basic remediation steps and generates remediation information associated with the performance of basic remediation steps [15]. The device emulation orchestration engine sends the remediation information to the application upgrade monitoring agent (434). The remediation information indicates that the basic remediation steps were not successful at remediating the application upgrade. As a result, the application upgrade monitoring agent (434) sends a notification indicating that the basic remediation steps were unsuccessful to the remediation orchestrator (486) [16].

The remediation orchestrator (486) determines, based on the notification, that the basic remediation steps were not successful [17]. Based on the determination, the remediation orchestration identifies remediation steps associated with previous application upgrade failures that are similar to the application upgrade using a KNN algorithm, an application remediation repository, and the application upgrade information [18]. The remediation orchestrator (486) sends a request to the application upgrade monitoring agent (434) initiating the performance of identified remediation steps associated with the similar previous application upgrade to remediate the application upgrade [19].

In response to the request to perform the remediation steps, the application upgrade monitoring agent (434) instructs the device emulation orchestration engine to perform the remediation steps. The device emulation orchestration engine performs the remediation steps and generates remediation information associated with the performance of remediation steps [20]. The device emulation orchestration engine sends the remediation information to the application upgrade monitoring agent (434). The remediation information indicates that the remediation steps were not successful at remediating the application upgrade. As a result, the application upgrade monitoring agent (434) sends a notification indicating that the remediation steps were unsuccessful to the remediation orchestrator (486) [21]. The remediation orchestrator (486) determines, based on the notification, that the remediation steps were not successful [22]. Based on the determination, the remediation orchestration identifies a remediation step associated with the highest reward count using a reinforcement learning algorithm, the application remediation repository, and the application upgrade information [23].

The remediation orchestrator (486) sends a request to the application upgrade monitoring agent (434) initiating the performance of identified remediation step associated with the highest reward count to remediate the application upgrade [24]. In response to the request to perform the remediation step, the application upgrade monitoring agent (434) instructs the device emulation orchestration engine to perform the remediation step. The device emulation orchestration engine performs the remediation step and generates remediation information associated with the performance of remediation step [25]. The device emulation orchestration engine sends the remediation information to the application upgrade monitoring agent (434). The remediation information indicates that the remediation step was not successful at remediating the application upgrade. As a result, the application upgrade monitoring agent (434) sends a notification indicating that the remediation steps was unsuccessful to the remediation orchestrator (486) [26]. The remediation orchestrator (486) determines, based on the notification, that the remediation step was not successful and decrements the reward count associated with the remediation step [27].

Based on the determination, the remediation orchestrator (486) makes an additional determination that the retry limit has not been reached, and another remediation step may be attempted [28]. Based on the determination, the remediation orchestration identifies a second remediation step associated with the highest remaining reward count using the reinforcement learning algorithm, the application remediation repository, and the application upgrade information [29].

The remediation orchestrator (486) sends a request to the application upgrade monitoring agent (434) initiating the performance of identified remediation step associated with the highest reward count to remediate the application upgrade [30]. In response to the request to perform the remediation step, the application upgrade monitoring agent (434) instructs the device emulation orchestration engine to perform the remediation step. The device emulation orchestration engine performs the remediation step and generates remediation information associated with the performance of remediation step [31]. The device emulation orchestration engine sends the remediation information to the application upgrade monitoring agent (434). The remediation information indicates that the remediation step was successful at remediating the application upgrade. As a result, the application upgrade monitoring agent (434) determines that the remediation step was successful [32]. In response to the determination, the application upgrade monitoring agent (434) sends a request to perform the application update and the successful remediation step to the client device upgrade manager (400) [33]. After obtaining the request, the client device upgrade manager (400) performs the application upgrade and the successful remediation step on client device A (422) to upgrade application B (422A).

End of Fourth Example

As discussed above, embodiments of the invention may be implemented using computing devices. FIG. 11 shows a diagram of a computing device in accordance with one or more embodiments of the invention. The computing device (1100) may include one or more computer processors (1102), non-persistent storage (1104) (e.g., volatile memory, such as random access memory (RAM), cache memory), persistent storage (1106) (e.g., a hard disk, an optical drive such as a compact disk (CD) drive or digital versatile disk (DVD) drive, a flash memory, etc.), a communication interface (1112) (e.g., Bluetooth interface, infrared interface, network interface, optical interface, etc.), input devices (1110), output devices (1108), and numerous other elements (not shown) and functionalities. Each of these components is described below.

In one embodiment of the invention, the computer processor(s) (1102) may be an integrated circuit for processing instructions. For example, the computer processor(s) may be one or more cores or micro-cores of a processor. The computing device (1100) may also include one or more input devices (1110), such as a touchscreen, keyboard, mouse, microphone, touchpad, electronic pen, or any other type of input device. Further, the communication interface (1112)

may include an integrated circuit for connecting the computing device (1100) to a network (not shown) (e.g., a local area network (LAN), a wide area network (WAN) such as the Internet, mobile network, or any other type of network) and/or to another device, such as another computing device.

In one embodiment of the invention, the computing device (1100) may include one or more output devices (1108), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (1102), non-persistent storage (1104), and persistent storage (1106). Many different types of computing devices exist, and the aforementioned input and output device(s) may take other forms.

One or more embodiments of the invention may be implemented using instructions executed by one or more processors of the data management device. Further, such instructions may correspond to computer readable instructions that are stored on one or more non-transitory computer readable mediums.

One or more embodiments of the invention may improve the operation of one or more computing devices. More specifically, embodiments of the invention improve the use of computing devices that emulate a customer environment of client devices. Embodiments of the invention include a method and system for generating future state predictions associated with application upgrades performed on an emulated device. The future state predictions may be used to remediate application upgrades that have failed due to the dynamic nature of application upgrades over time. The future state predictions may indicate the most likely future state of the application upgrade. As a result, application upgrade failures may be remediated based on the most likely future state of the application upgrade instead of only the current state of the application upgrade. Therefore, state changes in application upgrades that have failed may be taken into account when remediating application upgrade, improving the reliability and efficiency of remediating application upgrade failures.

While the invention has been described above with respect to a limited number of embodiments, those skilled in the art, having the benefit of this disclosure, will appreciate that other embodiments can be devised which do not depart from the scope of the invention as disclosed herein. Accordingly, the scope of the invention should be limited only by the attached claims.

What is claimed is:

1. A method for managing a client environment, the method comprising:
obtaining, by a predictor, a future state prediction request associated with an application upgrade on an emulation of a client device, wherein:
the application upgrade failed,
the application upgrade is associated with the client device executing on a client environment, and
the application upgrade is performed in a device emulation container in a device emulation system, wherein the device emulation container comprises the emulation of the client device;
in response to the future state prediction request:
obtaining live data associated with the application upgrade;
performing natural language processing on the live data to obtain processed live data;
applying a future state prediction model to the processed live data to generate a future state prediction; and
initiating remediation of the application upgrade based on the future state prediction.

2. The method of claim 1, wherein the live data comprises log information generated by a device emulation agent associated with the device emulation container during the performance of the application upgrade.

3. The method of claim 2, wherein performing natural language processing on the live data to obtain processed live data comprises:
tokenizing the log information to generate tokens, wherein the processed live data comprises the tokens.

4. The method of claim 1, further comprising:
prior to obtaining the future state prediction request:
obtaining, by the predictor, a future state prediction model training request;
in response to obtaining the state prediction model training request:
obtaining training data associated with the state prediction model training request;
perform natural language processing on the training data to obtain processed training data;
applying a prediction algorithm to a first portion of the processed training data to generate the future state prediction model; and
performing verification on the future state prediction model using a second portion of the processed training data.

5. The method of claim 4, wherein the prediction algorithm comprises a Markov chain.

6. A non-transitory computer readable medium comprising computer readable program code, which when executed by a computer processor enables the computer processor to perform a method for managing a client environment, the method comprising:
obtaining, by a predictor, a future state prediction request associated with an application upgrade on an emulation of a client device, wherein:
the application upgrade failed,
the application upgrade is associated with the client device executing on a client environment, and
the application upgrade is performed in a device emulation container in a device emulation system, wherein the device emulation container comprises the emulation of the client device;
in response to the future state prediction request:
obtaining live data associated with the application upgrade;
performing natural language processing on the live data to obtain processed live data;
applying a future state prediction model to the processed live data to generate a future state prediction; and
initiating remediation of the application upgrade based on the future state prediction.

7. The non-transitory computer readable medium of claim 6, wherein the live data comprises log information generated by a device emulation agent associated with the device emulation container during the performance of the application upgrade.

8. The non-transitory computer readable medium of claim 7, wherein performing natural language processing on the live data to obtain processed live data comprises:

tokenizing the log information to generate tokens, wherein the processed live data comprises the tokens.

9. The non-transitory computer readable medium of claim 6, wherein the method further comprising:
prior to obtaining the future state prediction request:
obtaining, by the predictor, a future state prediction model training request;
in response to obtaining the state prediction model training request:
obtaining training data associated with the state prediction model training request;
perform natural language processing on the training data to obtain processed training data;
applying a prediction algorithm to a first portion of the processed training data to generate the future state prediction model; and
performing verification on the future state prediction model using a second portion of the processed training data.

10. The non-transitory computer readable medium of claim 9, wherein the prediction algorithm comprises a Markov chain.

11. A system comprising:
a device emulation system;
a client environment;
a processor; and
memory comprising instructions, which when executed by the processor, perform a method comprising:
obtaining, by a predictor, a future state prediction request associated with an application upgrade on an emulation of a client device, wherein:
the application upgrade failed,
the application upgrade is associated with the client device executing on a client environment, and
the application upgrade is performed in a device emulation container in a device emulation system, wherein the device emulation container comprises the emulation of the client device;
in response to the future state prediction request:
obtaining live data associated with the application upgrade;
performing natural language processing on the live data to obtain processed live data;
applying a future state prediction model to the processed live data to generate a future state prediction; and
initiating remediation of the application upgrade based on the future state prediction.

12. The system of claim 11, wherein the live data comprises log information generated by a device emulation agent associated with the device emulation container during the performance of the application upgrade.

13. The system of claim 12, wherein performing natural language processing on the live data to obtain processed live data comprises:
tokenizing the log information to generate tokens, wherein the processed live data comprises the tokens.

14. The system of claim 11, wherein the method further comprising: prior to obtaining the future state prediction request:
obtaining, by the predictor, a future state prediction model training request;
in response to obtaining the state prediction model training request:
obtaining training data associated with the state prediction model training request;
perform natural language processing on the training data to obtain processed training data;
applying a prediction algorithm to a first portion of the processed training data to generate the future state prediction model; and
performing verification on the future state prediction model using a second portion of the processed training data.

* * * * *